United States Patent
Watanabe et al.

(10) Patent No.: US 11,637,952 B2
(45) Date of Patent: Apr. 25, 2023

(54) REMOTE DISPLAY SYSTEM, ROBOT, AND DISPLAY TERMINAL

(71) Applicant: HONDA MOTOR CO., LTD., Tokyo (JP)

(72) Inventors: Kei Watanabe, Wako (JP); Susumu Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/454,178

(22) Filed: Nov. 9, 2021

(65) Prior Publication Data

US 2022/0159173 A1 May 19, 2022

(30) Foreign Application Priority Data

Nov. 13, 2020 (JP) .............................. JP2020-189656

(51) Int. Cl.
*H04N 5/232* (2006.01)
*B25J 9/16* (2006.01)

(52) U.S. Cl.
CPC ........ *H04N 5/23218* (2018.08); *B25J 9/1697* (2013.01); *H04N 5/23293* (2013.01)

(58) Field of Classification Search
CPC ................................................ H04N 5/23218
USPC ..................................... 348/211.99
See application file for complete search history.

(56) References Cited

U.S. PATENT DOCUMENTS

| 6,072,522 A | 6/2000 | Ippolito et al. |
| 2014/0049595 A1 | 2/2014 | Feng et al. |
| 2019/0373173 A1* | 12/2019 | Wang ................. H04N 5/23241 |

FOREIGN PATENT DOCUMENTS

| DE | 102018118423 | * | 5/2019 |
| EP | 2688295 A2 | | 1/2014 |
| EP | 3566904 A1 | | 11/2019 |
| JP | 2016-225875 A | | 12/2016 |
| JP | 2019-062293 | | 4/2019 |

OTHER PUBLICATIONS

European Search Report dated Mar. 24, 2022, 12 pages.
European Office Action dated Jan. 12, 2023, European Application No. 21 205 155.1-1208, 5 pages.

* cited by examiner

*Primary Examiner* — Joel W Fosselman
(74) *Attorney, Agent, or Firm* — Rankin, Hill & Clark LLP

(57) ABSTRACT

A remote display system includes a screen display controller configured to perform a first screen switching process of switching a monitor screen to be displayed on a terminal display unit of a display terminal from a first monitor screen for displaying a first image range of a captured image by a robot camera to a second monitor screen for displaying a second image range different from the first image range of the captured image, in accordance with a predetermined screen switching condition.

21 Claims, 14 Drawing Sheets

REMOTE DISPLAY SYSTEM, ROBOT, AND DISPLAY TERMINAL

INCORPORATION BY REFERENCE

The present application claims priority under 35 U.S.C. § 119 to Japanese Patent Application No. 2020-189656 filed on Nov. 13, 2020. The content of the application is incorporated herein by reference in its entirety.

BACKGROUND

Technical Field

The present invention relates to a remote display system, a robot, and a display terminal.

Related Art

There has been conventionally proposed a system in which a user remotely operates a mobile robot including a camera using an operation terminal (see, for example, JP 2019-62293 A).

According to the above system, an image captured by the camera of the mobile robot is transmitted to the operation terminal, and a monitor screen including the captured image of surroundings of the mobile robot is displayed on a display unit of the operation terminal. The user of the operation terminal visually recognizes the monitor screen, and is able to confirm the surrounding situation of the mobile robot.

SUMMARY

As described above, in a case of making the user recognize a surrounding situation of the robot on the monitor screen for displaying the image captured by the camera of the robot, it is desirable that the monitor screen is displayed in a mode by which the user easily recognizes the surrounding situation of the robot.

The present invention has been made in view of the above circumstances, and has an object to provide a remote display system, a robot, and a display terminal, which are capable of displaying a monitor screen of the robot on the display terminal in a mode by which a user easily recognizes a surrounding situation of the robot.

As a first aspect for achieving the above object, there is a remote display system including a robot; a display terminal configured to communicate with the robot, the robot including a camera configured to capture an image of surroundings of the robot, and transmitting, to the display terminal, monitor image information based on a captured image by the camera, the display terminal including a terminal display unit, receiving the monitor image information, and displaying, on the terminal display unit, a monitor screen including a monitor image based on the captured image; and a screen display controller configured to perform a first screen switching process of switching the monitor screen to be displayed on the terminal display unit from a first monitor screen for displaying a first image range of the captured image to a second monitor screen for displaying a second image range different from the first image range of the captured image, in accordance with a predetermined screen switching condition.

In the above remote display system, a configuration may be made to further include an in-motion object recognition unit configured to recognize an object in motion present in the surroundings of the camera, and the in-motion object recognition unit sets, as the screen switching condition, that the object in motion is recognized outside a first image-capturing range corresponding to the first image range within an image-capturing range of the camera, and the screen display controller sets the second image range to include an image part of the object in motion.

In the above remote display system, a configuration may be made such that the in-motion object recognition unit recognizes either a person or another robot that is in motion as the object in motion.

In the above remote display system, a configuration may be made such that the screen display controller sets, as the second monitor screen, a screen for displaying an enlarged image of an image range including the image part of the object in motion that has been recognized by the in-motion object recognition unit.

In the above remote display system, a configuration may be made such that the screen display controller sets, as the second image range, a range obtained by enlarging the first image range to include the image part of the object in motion that has been recognized by the in-motion object recognition unit.

In the above remote display system, a configuration may be made such that the screen display controller sets the first image range to include all of image parts of a person and another robot included in the captured image.

In the above remote display system, a configuration may be made such that when a predetermined time has elapsed since a time when the monitor screen is switched from the first monitor screen to the second monitor screen in accordance with the screen switching condition, the screen display controller returns the monitor screen to the first monitor screen.

In the above remote display system, a configuration may be made such that the display terminal includes a display image range setting unit configured to set a range of the captured image to be displayed on the terminal display unit in response to an operation on the display terminal by a user, and the screen display controller sets, as the second image range, the range that has been set by the display image range setting unit.

In the above remote display system, a configuration may be made such that the robot includes a body unit, and a head unit configured to rotate or swing with respect to the body unit, and the camera is provided in the body unit.

In the above remote display system, a configuration may be made such that the robot includes an object detection sensor configured to detect an object present in the surroundings of the robot, and the in-motion object recognition unit recognizes the object in motion, based on detection information by the object detection sensor.

In the above remote display system, a configuration may be made to further include a current location recognition unit configured to recognize a current location of the robot, based on map information, and in a state where the current location recognition unit recognizes that the robot is located inside a room, when the object detection sensor detects an object entering the room, the in-motion object recognition unit recognizes the object as the object in motion.

In the above remote display system, a configuration may be made such that the robot includes an identification signal reception unit configured to receive an identification signal transmitted from an object, and the in-motion object recognition unit recognizes the object in motion, based on a reception situation of the identification signal by the identification signal reception unit.

In the above remote display system, a configuration may be made such that the robot includes a sound sensor configured to detect a sound in the surroundings of the robot, and the in-motion object recognition unit recognizes the object in motion in accordance with a detection situation of the sound by the sound sensor.

In the above remote display system, a configuration may be made such that when the in-motion object recognition unit recognizes a plurality of the objects in motion, based on the detection situation of the sound by the sound sensor, the screen display controller sets the second image range to include the image part of the object in motion having a maximum volume of an emitted sound.

In the above remote display system, a configuration may be made such that the in-motion object recognition unit recognizes the object in motion that is standing and speaking, based on the captured image and the detection situation of the sound by the sound sensor, and when the in-motion object recognition unit recognizes the object in motion that is standing and speaking, the screen display controller sets the second image range to include an image part of the object in motion that is standing and speaking.

In the above remote display system, a configuration may be made such that when the in-motion object recognition unit recognizes a plurality of the objects in motion, the screen display controller sets the second image range to include an image part of the object in motion selected by a priority order set in a sequential order of an object in motion that is speaking at a largest voice, an object in motion that is moving, and the object in motion that is standing and speaking.

In the above remote display system, a configuration may be made to further include a camera image-capturing range controller configured to control an image-capturing range of the camera to include all of image parts of a person and another robot present in the surroundings of the robot in the captured image by the camera.

In the above remote display system, a configuration may be made to further include a horizontal corresponding image extraction unit configured to extract, from the captured image, a horizontal corresponding image corresponding to a case where an image-capturing direction of the camera is a horizontal direction, and the screen display controller extracts the first monitor screen from the horizontal corresponding image.

In the above remote display system, a configuration may be made such that the screen display controller performs, in accordance with the screen switching condition, either the first screen switching process or a second screen switching process of switching the monitor screen from a third monitor screen for displaying an image part of a third image range of the captured image to a fourth monitor screen for displaying the image part of the third image range and a fourth image part obtained by enlarging a part of the third image range.

In the above remote display system, a configuration may be made such that the robot is a mobile robot, the remote display system further includes a moving situation recognition unit configured to recognize a movement situation of the robot, when the moving situation recognition unit recognizes that the robot is in a stopped state, the screen display controller performs the first screen switching process, and when the moving situation recognition unit recognizes that the robot is in a moving state, the screen display controller performs the second screen switching process.

As a second aspect for achieving the above object, there is a robot including a camera configured to capture an image of surroundings; a robot communication unit configured to communicate with a display terminal; a screen display controller configured to set a monitor screen to be displayed on the display terminal, the monitor screen being based on a captured image by the camera; and a monitor screen data transmission unit configured to transmit, via the robot communication unit to the display terminal, data of the monitor screen that has been set by the screen display controller, and the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition.

As a third aspect for achieving the above object, there is a display terminal including a terminal display unit; a terminal communication unit configured to communicate with a robot including a camera; a captured image acquisition unit configured to receive and acquire a captured image by the camera via the terminal communication unit, the captured image being transmitted from the robot; and a screen display controller configured to control a display of a monitor screen on the terminal display unit, based on the captured image, and the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition.

According to the above remote display system, by switching the screen display of the terminal display unit from the first monitor screen to the second monitor screen that is different in the image range of the captured image to be displayed from the first monitor screen in accordance with the screen switching condition, the monitor screen of the robot can be displayed on the display terminal in a mode by which the user easily recognizes the surrounding situation of the robot.

DETAILED DESCRIPTION

1. Configuration of Remote Operation System

Figure 1:
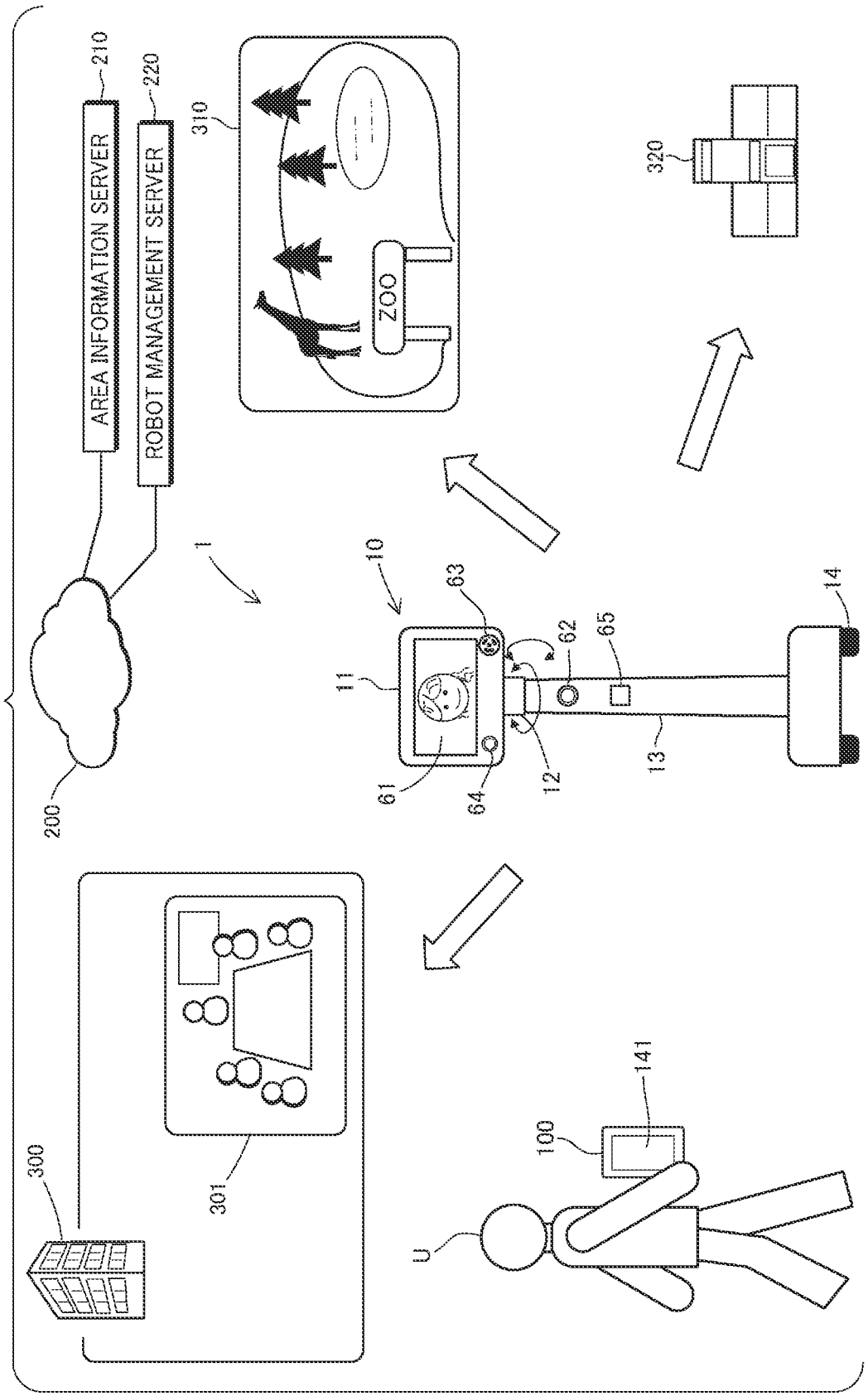
FIG. 1 is an explanatory diagram of a configuration of a remote operation system.

A remote operation system 1 in the present embodiment will be described with reference to FIG. 1. The remote operation system 1 includes a mobile robot 10 and an operation terminal 100, and the mobile robot 10 and the operation terminal 100 communicate with each other through a communication network 200. The mobile robot 10 includes a head unit 11, a neck unit 12, a body unit 13, and a traveling unit 14.

The head unit 11 is provided with a robot display unit 61, a robot speaker 63, and a robot microphone 64. The neck unit 12 causes the head unit 11 to perform a swing motion for swinging vertically and horizontally (a head-shaking motion) with respect to the body unit 13. The body unit 13 is provided with a robot camera 62 and a LiDAR 65. The robot camera 62 captures an image of surroundings of the mobile robot 10, and the LiDAR 65 detects a distance to an object present in the surroundings of the mobile robot 10 by laser irradiation. The LiDAR 65 corresponds to an object detection sensor.

An operation screen including a monitor image transmitted from the mobile robot 10 is displayed on a terminal display unit 141 (touch panel) of the operation terminal 100. A user U of the remote operation system 1 visually recognizes the monitor image of the surroundings of the mobile robot 10 displayed on the operation screen to recognize the situation of a movement destination of the mobile robot 10. Then, the user U remotely operates the mobile robot 10 on the operation terminal 100 in accordance with the situation of the mobile robot 10.

The mobile robot 10 is a so-called telepresence robot, and for example, moves inside a building 300 to participate in a conference at a conference place 301, or moves outdoors to a sightseeing spot 310 or a destination 320 such as a hotel. The robot display unit 61 of the mobile robot 10 displays a face image of the user U or an icon imitating the face of the user U. This configuration enables making people near the mobile robot 10 feel as if the user U itself were present at the movement destination of the mobile robot 10.

In addition, the user U visually recognizes the image of the surroundings of the mobile robot 10 displayed on the operation terminal 100, and can have a feeling as if the user U itself were present at the movement destination of the mobile robot 10. Furthermore, the user U is able to communicate with a person or another robot present at the movement destination of the mobile robot 10 over a video call or a chat on the operation terminal 100.

The mobile robot 10 acquires, through the communication network 200, information of the inside of a movement area of the mobile robot 10 from an area information server 210, and also acquires information of the mobile robot 10 or another robot from a robot management server 220.

2. Configuration of Mobile Robot

A configuration of the mobile robot 10 will be described with reference to FIG. 2. The mobile robot 10 includes, in addition to the above-described constituent elements, a robot communication unit 60, a robot controller 20, a global navigation satellite system (GNSS) sensor 66, a speed sensor 67, and an inclination sensor 68.

The robot communication unit 60 communicates with the operation terminal 100 through the communication network 200. Note that in a situation in which the distance between the mobile robot 10 and the operation terminal 100 is short, the robot communication unit 60 may directly communicate with the operation terminal 100. The GNSS sensor 66 receives radio waves from a GNSS satellite, and detects the current location of the mobile robot 10. The speed sensor 67 detects a moving speed (traveling speed) of the mobile robot 10. The inclination sensor 68 detects an inclination angle of the mobile robot 10 with respect to the horizontal direction.

The robot controller 20 is configured with a robot processor 30, a robot memory 50, an interface circuit, not illustrated, and the like. The robot memory 50 stores a robot control program 51, a map database (DB) 52, a building DB 53, and the like. A map of the movement area of the mobile robot 10 is recorded in the map DB 52. A floor layout and the like of a building present in the movement area of the mobile robot 10 is recorded in the building DB 53.

The map DB 52 and the building DB 53 may be downloaded from the area information server 210 to the mobile robot 10. The robot control program 51 may be downloaded from the robot management server 220 to the mobile robot 10.

The robot processor 30 reads and executes the robot control program 51 from the robot memory 50 so as to function as a screen display controller 31, a current location recognition unit 32, a moving situation recognition unit 33, a display mode switching unit 34, a surrounding target object recognition unit 35, a communication target selection reception unit 36, a communication controller 37, an obstacle recognition unit 38, an in-motion object recognition unit 39, a destination recognition unit 40, a movement route recognition unit 41, a display image range setting unit 42, a camera image-capturing range controller 43, a horizontal direction image acquisition unit 44, a user face image display controller 45, and a display layout change unit 46.

The screen display controller 31 changes data of the operation screen to be transmitted to the operation terminal 100 in accordance with a stop display mode corresponding to a case where the mobile robot 10 is in a stopped state and a movement display mode corresponding to a case where the mobile robot 10 is in a moving state (traveling state), so as to control the operation screen to be displayed on the terminal display unit 141 of the operation terminal 100. Details of the display mode on the operation screen in each display mode will be described later.

The current location recognition unit 32 recognizes the current location (latitude, longitude) of the mobile robot 10, based on a location detection signal output from the GNSS sensor 66. The moving situation recognition unit 33 recognizes the moving situation of the mobile robot 10, based on a change in the current location of the mobile robot 10 recognized by the current location recognition unit 32, a moving speed of the mobile robot 10 detected by the speed sensor 67, map data that has been acquired from the map DB 52, a building layout that has been acquired from the building DB 53, and the like. In a case where the mobile robot 10 is located indoors, the current location recognition unit 32 matches a detected situation of a surrounding object by the LiDAR 65 with indoor layout data that has been acquired from the building DB 53, and recognizes the current location of the mobile robot 10.

The display mode switching unit 34 switches the display mode of the operation screen on the display terminal 100 between the stop display mode and the movement display mode in response to a selection operation by the user U. The surrounding target object recognition unit 35 recognizes a person and another robot present in the surroundings of the mobile robot 10 each as a surrounding target object, based on the image captured by the robot camera 62, an object detection signal detected by the LiDAR 65, and a detected sound detected by the robot microphone 64. Note that the robot communication unit 60 may receive an identification signal transmitted from a transmitter carried by a person or another robot, and may recognize a person or another robot present in the surroundings of the mobile robot 10.

The communication target selection reception unit 36 receives a selection of a surrounding target object with whom the user U desires to communicate, in response to a selection operation on the operation screen by the user U. The communication controller 37 controls communication between the user U and the surrounding target object, the selection of which has been received by the communication target selection reception unit 36. The communication controller 37 enables a video call, a voice call, and a chat between the user U and the surrounding target object.

The obstacle recognition unit 38 recognizes an obstacle present in the surroundings of the mobile robot 10, based on the image captured by the robot camera 62 and the object detection signal detected by the LiDAR 65. The in-motion object recognition unit 39 recognizes an object in motion in the surroundings of the mobile robot 10, based on an image captured by the robot camera 62, an object detection signal detected by the LiDAR 65, and a detected sound detected by the robot microphone 64. The object in motion includes a person and another robot except for the mobile robot 10. Here, the "motion" includes an action of uttering a voice such as a speech, in addition to an action of moving its body.

The destination recognition unit 40 recognizes a movement destination of the mobile robot 10 that has been set by the user U. The user U operates the operation terminal 100, and sets the destination of the mobile robot 10. Here, the destination includes not only a final destination for which the mobile robot 10 is heading but also a stop point on its way to the final destination.

The movement route recognition unit 41 recognizes a movement route of the mobile robot 10, based on the current location of the mobile robot 10 that has been recognized by the current location recognition unit 32, the destination of the mobile robot 10 that has been recognized by the destination recognition unit 40, and the map data that has been acquired from the map DB 52. The display image range setting unit 42 sets a range of the monitor image to be displayed on the operation screen of the operation terminal 100 in response to an operation by the user U.

The camera image-capturing range controller 43 moves the mobile robot 10 so that all persons and other robots present in the surroundings of the mobile robot 10 are included in an image-capturing range of the robot camera 62. Note that, in a case where the robot camera 62 is configured to be switchable between a wide angle and a telescope, the robot camera 62 may be switched to the wide angle so that all persons and other robots present in the surroundings of the mobile robot 10 can be included in the image-capturing range of the robot camera 62.

Figure 14:
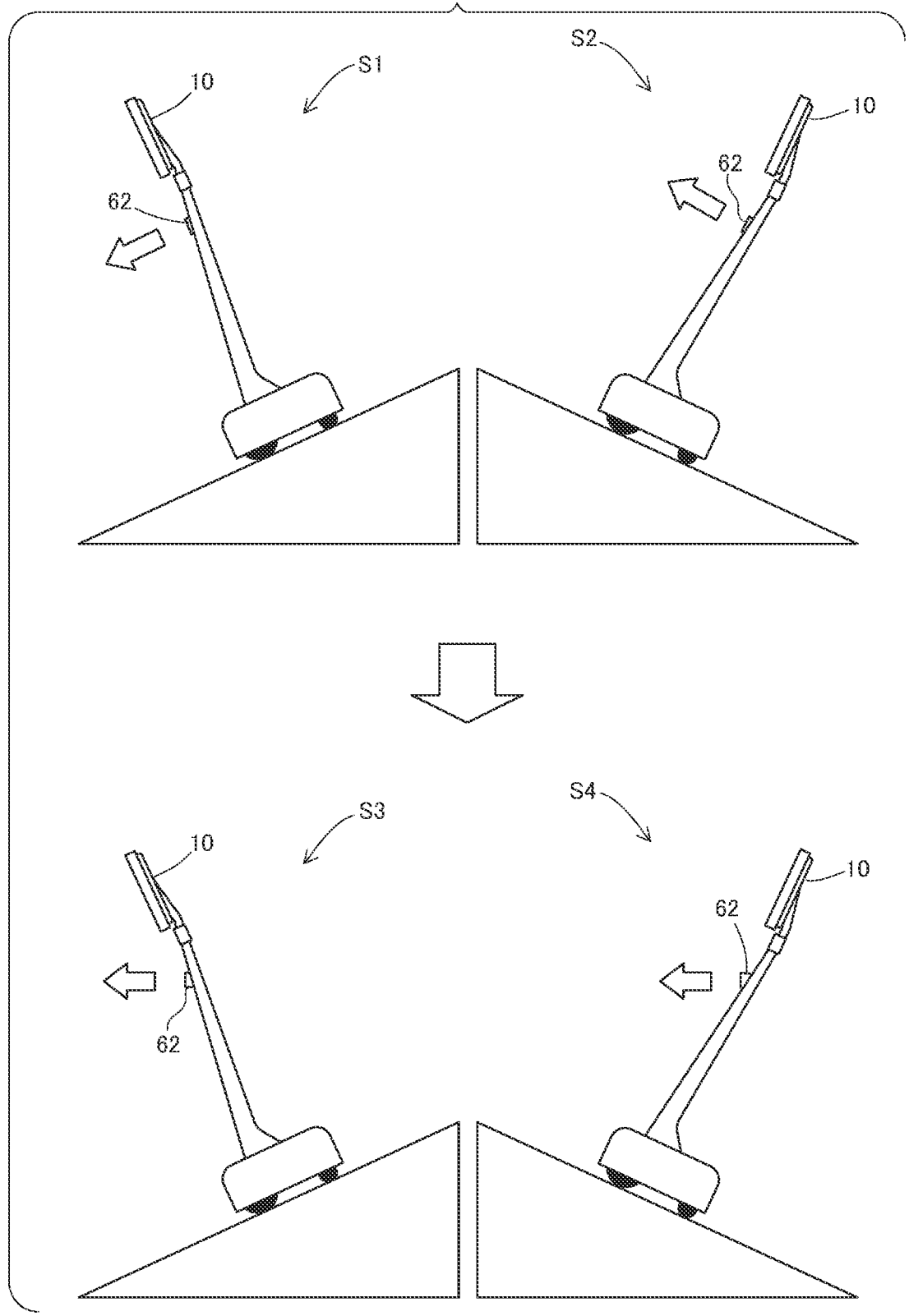
FIG. 14 is an explanatory diagram in a mode in which an imaging direction of a camera is controlled to a horizontal direction in a case where the mobile robot is moving on a slope.

In a case where the robot camera 62 has a function of changing an imaging direction, in a situation in which the mobile robot 10 is located on a slope as illustrated in S1 and S2 of FIG. 14 and the robot camera 62 is facing either upward or downward with respect to the horizontal direction, the horizontal direction image acquisition unit 44 performs a process of causing the imaging direction of the robot camera 62 to be the horizontal direction as illustrated in S3 and S4. This process enables acquisition of a captured image in the traveling direction of the mobile robot 10. In addition, in a case where the robot camera 62 does not have the function of changing the imaging direction, the horizontal direction image acquisition unit 44 extracts an image in a range corresponding to the horizontal direction (a horizontal corresponding image) from an image facing either upward or downward that has been captured by the robot camera 62 in the situation of S1 and S2 so as to acquire a captured image in the traveling direction of the mobile robot 10.

The user face image display controller 45 controls whether to cause the robot display unit 61 to display the face image of the user U in response to an operation on the operation terminal 100 by the user U. The face image of the user U may be a real-time image captured by a terminal camera 142 and transmitted to the mobile robot 10, or may be an image stored beforehand in the robot memory 50 of the mobile robot 10. When the face image of the user U is not displayed on the robot display unit 61, the user face image display controller 45 displays an icon imitating the face of the user U on the robot display unit 61 in response to the operation of the user U, or displays neither the face image nor the icon imitating the face on the robot display unit 61. The display layout change unit 46 changes the layout of the operation screen to be displayed on the operation terminal 100 in response to the operation on the operation terminal 100 by the user U.

3. Configuration of Operation Terminal

A configuration of the operation terminal 100 will be described with reference to FIG. 3. The operation terminal 100 includes a terminal controller 110, a terminal communication unit 140, a terminal display unit 141, the terminal camera 142, a terminal microphone 143, and a terminal speaker 144. The operation terminal 100 may be a dedicated terminal for operating the mobile robot 10, or may be a general-purpose communication terminal such as a smartphone or a tablet terminal.

The terminal communication unit 140 and the mobile robot 10 communicate with each other through the communication network 200 (see FIG. 1). The terminal display unit 141 is a touch panel, displays an operation screen corresponding to screen data output from the terminal controller 110, and outputs operation data corresponding to a touch operation of the user U to the terminal controller 110.

The terminal camera 142 captures a face image and the like of the user U, and outputs data of the captured image to the terminal controller 110. The terminal microphone 143 detects sound of voices or the like of the user U, and outputs sound data to the terminal controller 110. The terminal speaker 144 receives sound data output from the terminal controller 110, and outputs sound of voices or the like of a communication partner with whom a call is being made via the mobile robot 10.

A robot operation application program 131 for realizing the operation of the mobile robot 10 is stored in a terminal memory 130. A terminal processor 120 reads and executes the robot operation application program 131 so as to function as a robot operation screen controller 121 and a robot operation instruction controller 122.

The robot operation screen controller 121 receives data of the operation screen for the mobile robot 10 transmitted from the mobile robot 10 via the terminal communication unit 140, and displays the operation screen on the terminal display unit 141. The data of the operation screen includes monitor image information based on an image captured by the robot camera 62. The robot operation instruction controller 122 recognizes an instruction content of the operation by the user U from an operation signal corresponding to a touch operation on the operation screen output from the terminal display unit 141, and transmits operation data indicating the instruction content of the operation to the mobile robot 10 via the terminal communication unit 140.

4. Display Mode Switching Process

A description will be given with regard to a display mode switching process, performed by the mobile robot 10, on the operation screen of the terminal display unit 141 with reference to a flowchart illustrated in FIG. 4. The screen display controller 31 switches and controls the operation screen displayed on the operation terminal 100 between the operation screen in the stop display mode illustrated in FIGS. 7 to 9 and the display screen in the movement display mode illustrated in FIGS. 10 to 13.

Figure 7:
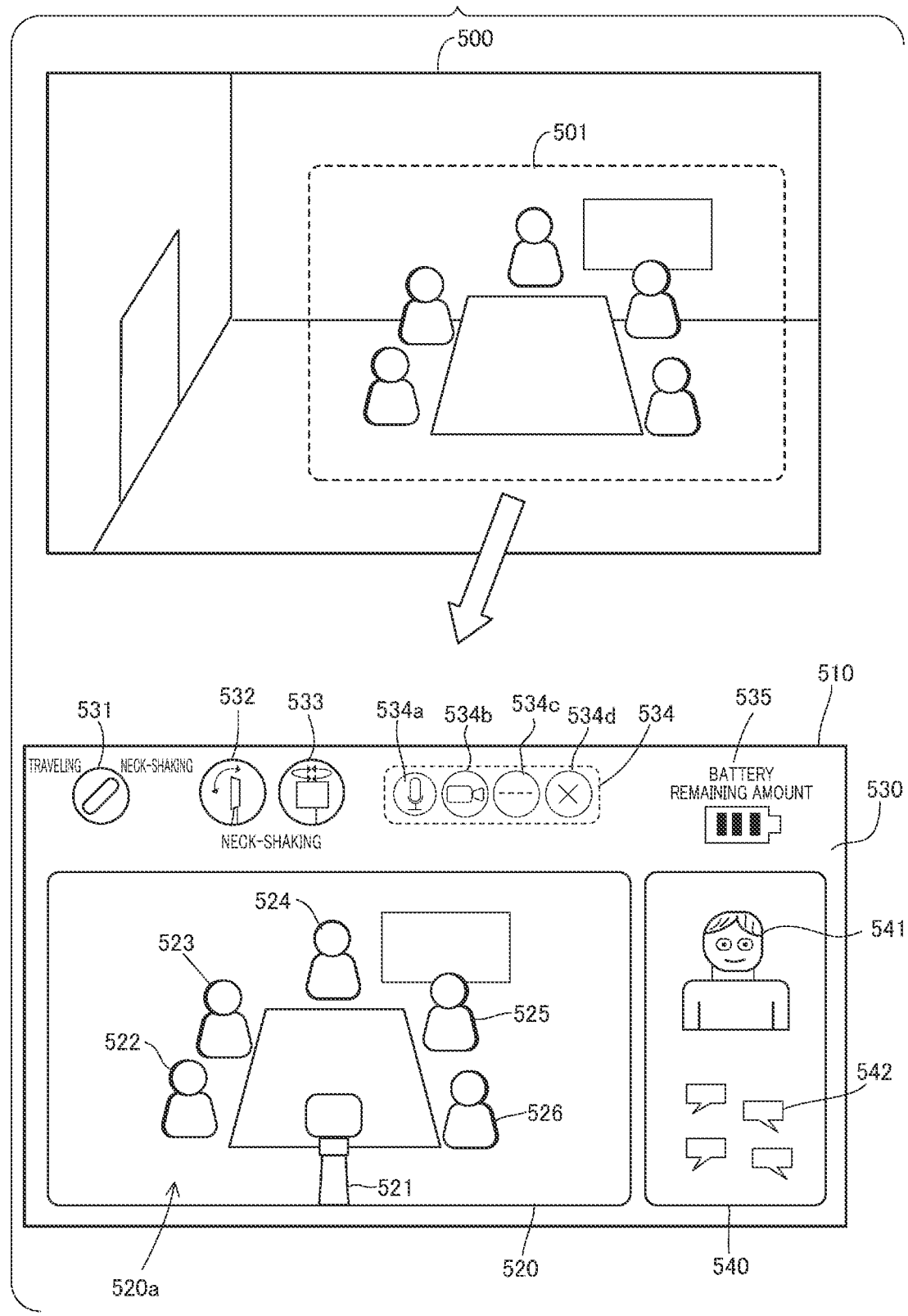
FIG. 7 is an explanatory diagram of a display mode of the operation screen in a situation in which the mobile robot is present in a conference place.

Referring to FIG. 7, an operation screen 510 includes a first sub screen 520 for displaying a monitor image that has been extracted from a captured image 500 of the surroundings of the mobile robot 10 captured by the robot camera 62, and a second sub screen 530 for operating the mobile robot 10. In the present embodiment, the second sub screen 530 is an area except for the first sub screen 520 of the operation screen 510. A mode changeover switch 531 for switching the display mode is displayed on the second sub screen 530.

The operation screen 510 in FIG. 7 is an operation screen in the stop display mode corresponding to a case where the mobile robot 10 is in a stopped state, and thus a vertical shaking icon 532 for instructing the head unit 11 of the mobile robot 10 to shake vertically and a horizontal shaking icon 533 for instructing the head unit 11 to shake horizontally are displayed. Furthermore, communication icons 534 for conducting communication over a video call, a voice call, a chat, and the like, and a communication window 540 are displayed.

The communication icons 534 include a voice call icon 534a for starting a voice call, a video call icon 534b for starting a video call, an option icon 534c for starting a chat or the like, and a call end icon 534d for ending the call. On a communication window 540, an image 541 of the face of a communication partner, a message 542 by chatting, and the like are displayed.

Figure 4:
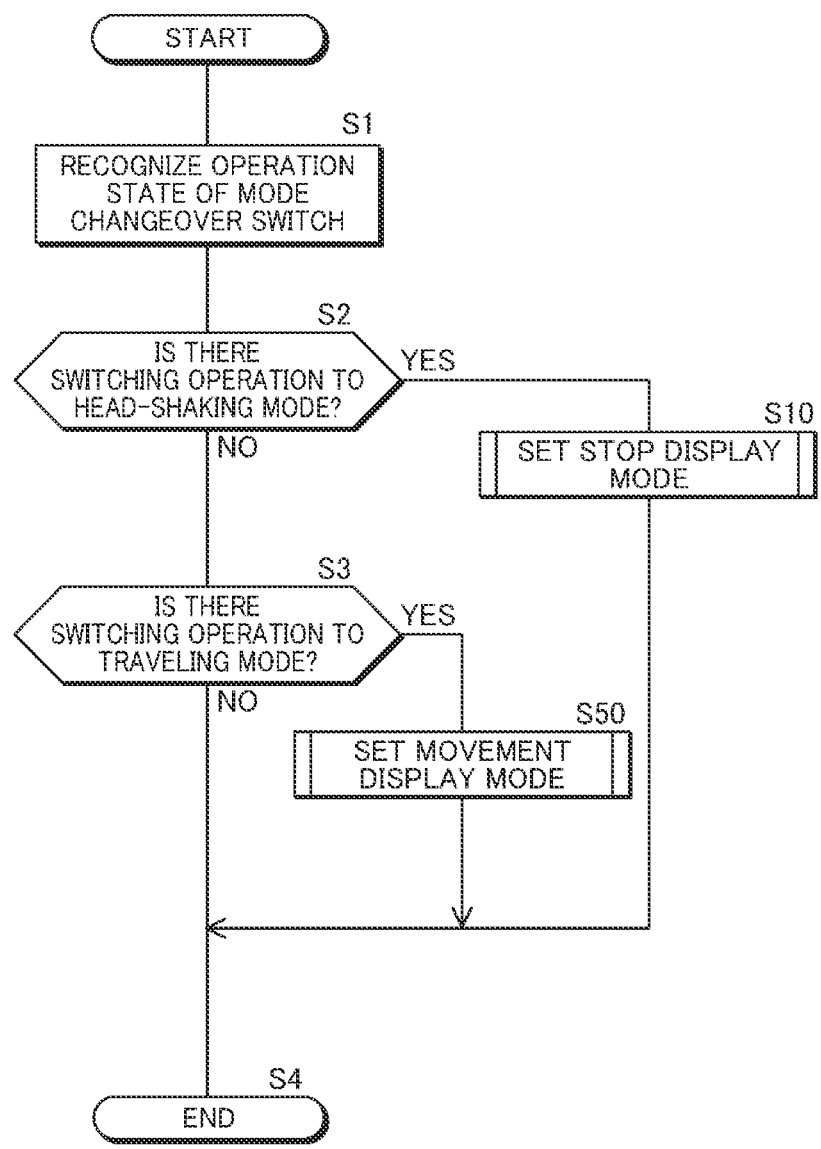
FIG. 4 is a flowchart of a switching process of an operation screen in accordance with a display mode.

In step S1 of FIG. 4, the display mode switching unit 34 recognizes an operation state of the mode changeover switch 531, based on the operation data transmitted from the operation terminal 100. Then, when the switching operation to a head-shaking mode is performed by the mode changeover switch 531, the display mode switching unit 34 advances the process to step S10 to set the stop display mode, and advances the process to step S4.

On the other hand, when the switching operation to the head-shaking mode is not performed, the display mode switching unit 34 advances the process to step S3 to determine whether the switching operation to a traveling mode on the mode changeover switch 531 has been performed. Then, when the switching operation to the traveling mode is performed, the display mode switching unit 34 advances the process to step S50. When the switching operation to the traveling mode is not performed, the display mode switching unit 34 advances the process to step S4. In step S4, the display mode switching unit 34 sets the display mode of the operation screen to the movement display mode.

5. Display of Operation Screen in Stop Display Mode

A description will be given with regard to display control of the operation screen in the stop display mode performed by the mobile robot 10 in accordance with the flowchart illustrated in FIG. 5, with reference to the operation screens illustrated in FIGS. 7 to 9.

Figure 5:
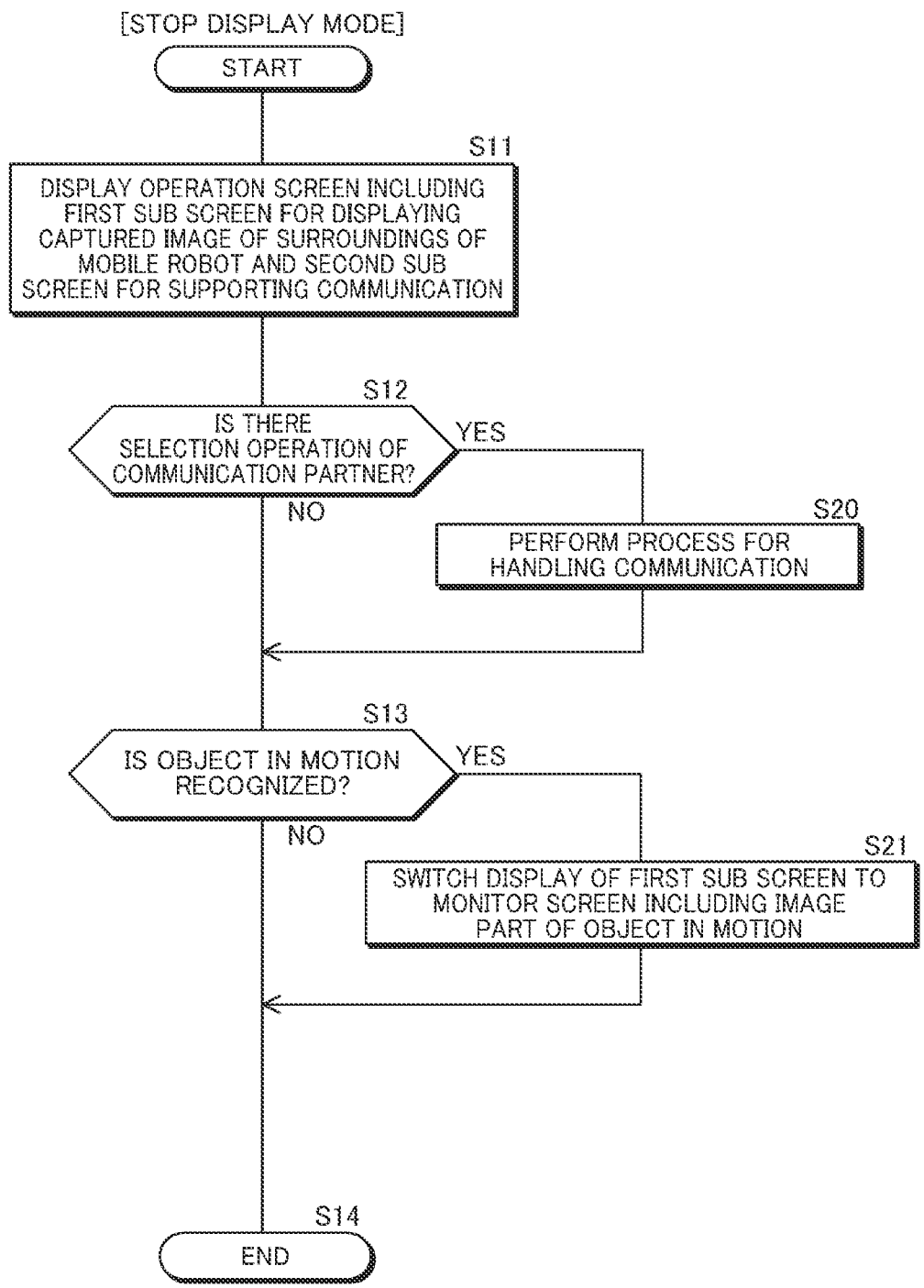
FIG. 5 is a flowchart of a display process of the operation screen in a stop display mode.

In step S11 of FIG. 5, as illustrated in FIG. 7, the screen display controller 31 transmits, to the operation terminal 100, the screen data of the operation screen 510 in the stop display mode, and causes the operation screen 510 to be displayed on the terminal display unit 141 of the operation terminal 100. As described above, the operation screen 510 includes the first sub screen 520 for displaying the monitor image based on the image 500 captured by the robot camera 62, and the second sub screen 530 for displaying an operation unit for communication.

FIG. 7 illustrates the captured image 500 and the operation screen 510 in a situation in which the mobile robot 10 is present in a conference place, and the captured image 500 includes image parts of conference participants. In this case, the camera image-capturing range controller 43 moves the mobile robot 10 to adjust the image-capturing range of the robot camera 62 so as to include the image parts of all persons participating in the conference and another robot. Note that, in a case where the robot camera 62 is provided with a function of changing the imaging direction or switching between the wide angle and the standard of the lens, the camera image-capturing range controller 43 also uses these functions to adjust the image-capturing range of the robot camera 62.

The screen display controller 31 displays, on the first sub screen 520, a first monitor image 520a obtained by extracting the image parts of a range 501, which is set to include the image parts of all persons and another robot present at the conference place, from the image 500 captured by the robot camera 62. The user U visually recognizes the first sub screen 520, and is able to confirm the persons participating in the conference and another robot.

In next step S12, the communication target selection reception unit 36 determines whether the user U has performed a touch operation on any one of image parts 522 to 526 of the persons displayed on the first sub screen 520. Then, when the image part of any person is touched, the communication target selection reception unit 36 sets the person corresponding to the image part that has been touched as a communication target with the user U, and advances the process to step S20.

In this case, the screen display controller 31 may display an enlarged image of the image part of the person that has been set as the communication target, on the first sub screen 520 or the second sub screen 530. FIG. 7 illustrates an example in which the screen display controller 31 displays the image 541 obtained by enlarging the image part of the person that has been set as the communication target, on the communication window 540 of the second sub screen 530. Further, the communication controller 37 may establish communication between a communication terminal used by the person that has been set as the communication target and the operation terminal 100, so that the communication (voice call, chat, or the like) with the user U may be enabled only for the person that has been set as the communication target.

In step S20, the communication controller 37 controls the communication between the user U and the communication target over a voice call, a video call, or a chat in response to an operation on the communication icon 534 by the user U, and advances the process to step S13.

In step S13, the in-motion object recognition unit 39 searches for an object in motion present in the surroundings of the mobile robot 10, and advances the process to step S21 when recognizing the object in motion. In step S21, as illustrated in FIG. 8, the screen display controller 31 extracts an image part of a range 504 including an image part 503 of the object in motion from an image 502 captured by the robot camera 62. Then, a second monitor screen 520b obtained by enlarging the image part of the range 504 is displayed on the first sub screen 520. Accordingly, the user U is able to easily recognize the object in motion approaching the mobile robot 10.

Figure 9:
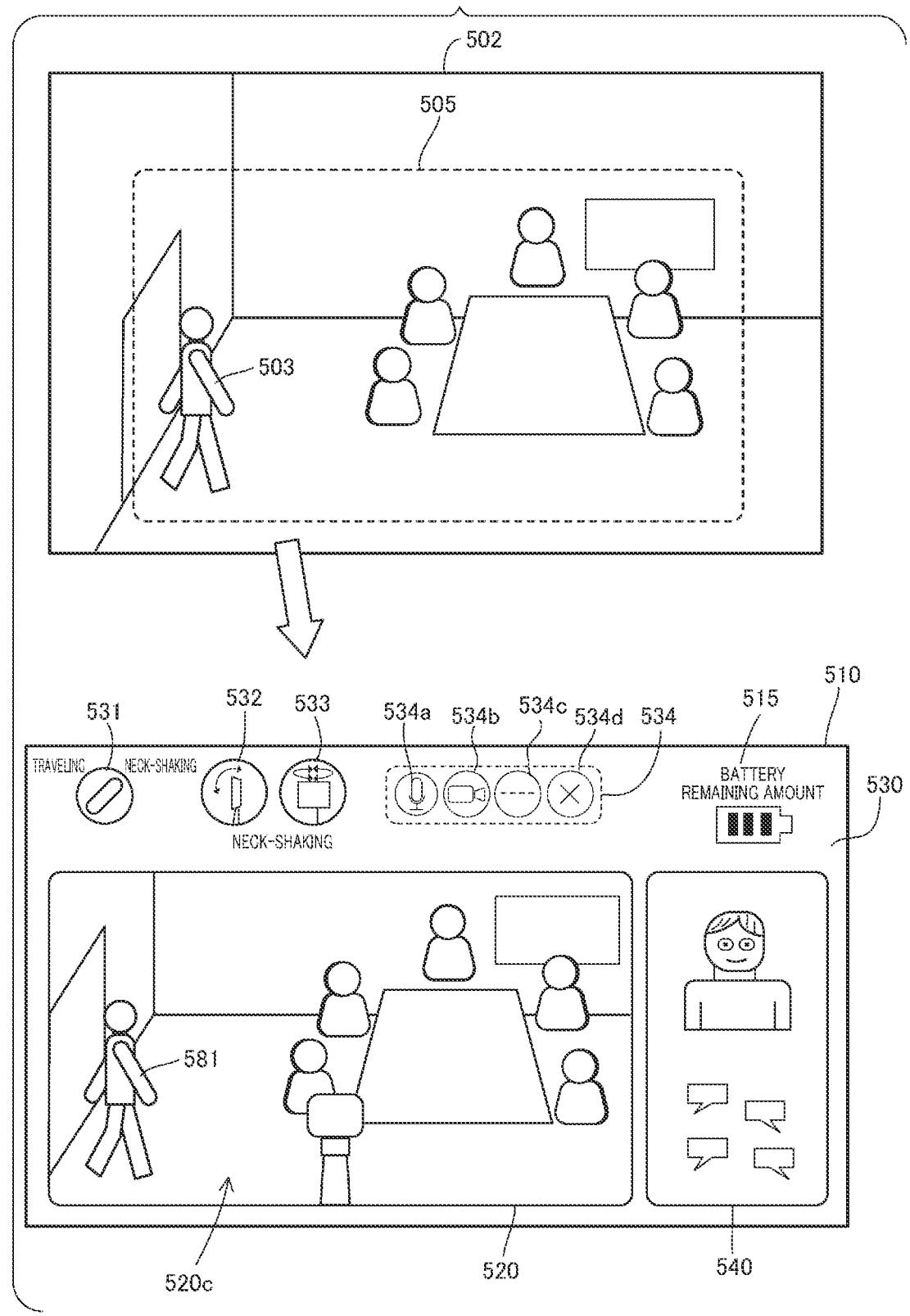
FIG. 9 is an explanatory diagram of another display mode of the operation screen in the situation in which the new person is added to the conference place.

Further, as illustrated in FIG. 9, the screen display controller 31 may extract the image part of a range 505 including the image part 503 of the object in motion and the image parts of all persons participating in the conference from the image 502 captured by the robot camera 62. In this case, the screen display controller 31 displays a monitor image of the range 505 on the first sub screen 520. Accordingly, the user U is able to easily recognize the object in motion approaching the mobile robot 10, while visually recognizing the situations of all the persons participating in the conference.

Here, when the in-motion object recognition unit 39 recognizes a plurality of objects in motion, the screen display controller 31 determines the object in motion to be a target of the process in step S21 in accordance with a following determination condition sequentially from priority order 1, priority order 2, and priority order 3.

Priority order 1: an object in motion that is speaking in the loudest voice

Priority order 2: an object in motion that is moving

Priority order 3: an object in motion standing up and speaking

Note that the above priority orders are merely an example, and for example, the user U may operate the operation terminal 100 to customize the priority orders.

6. Display of Operation Screen in Movement Display Mode

A description will be given with regard to display control of the operation screen in the movement display mode performed by the mobile robot 10 in accordance with the flowchart illustrated in FIG. 6, with reference to the operation screens illustrated in FIGS. 10 to 13.

Figure 6:
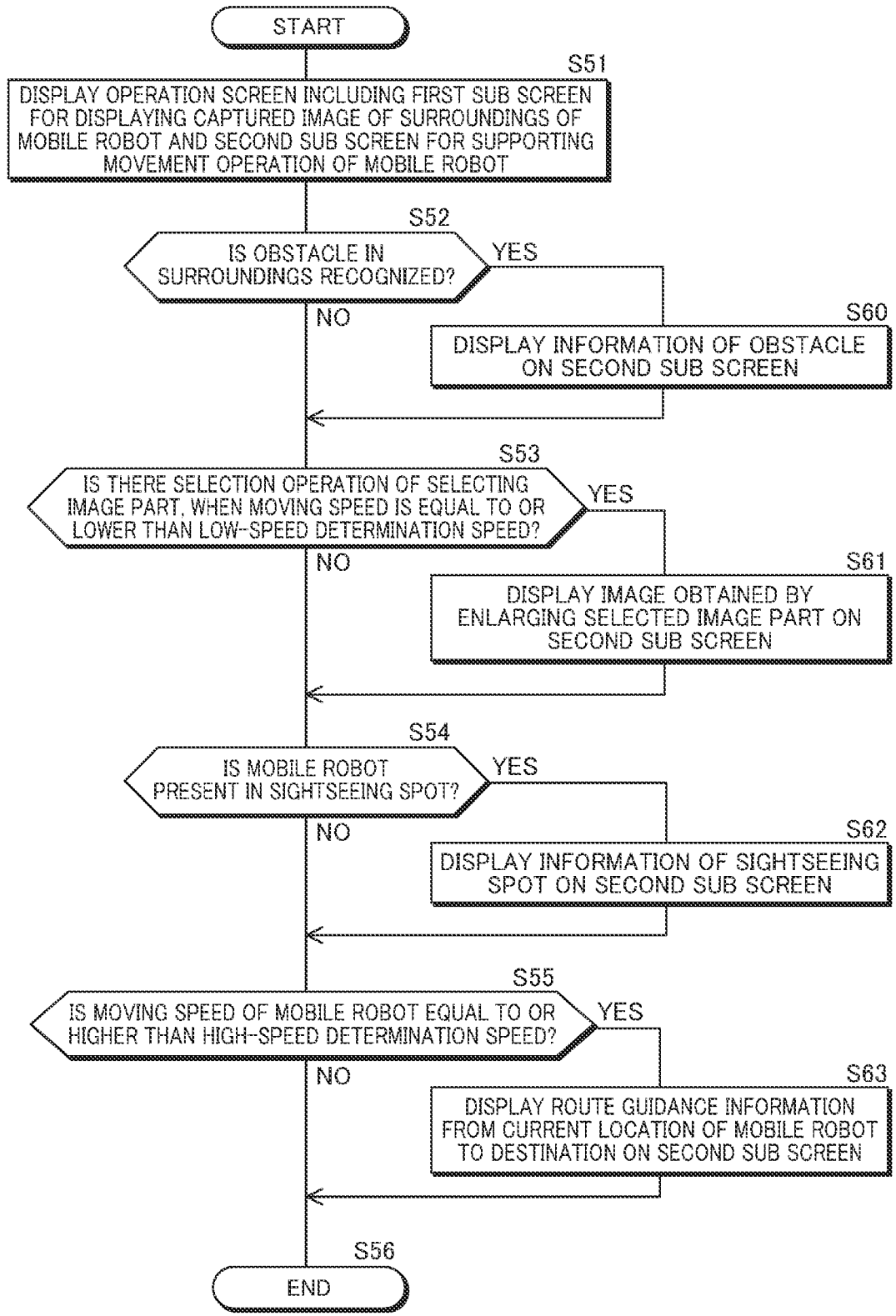
FIG. 6 is a flowchart of a display process of the operation screen in a movement display mode.
Figure 10:
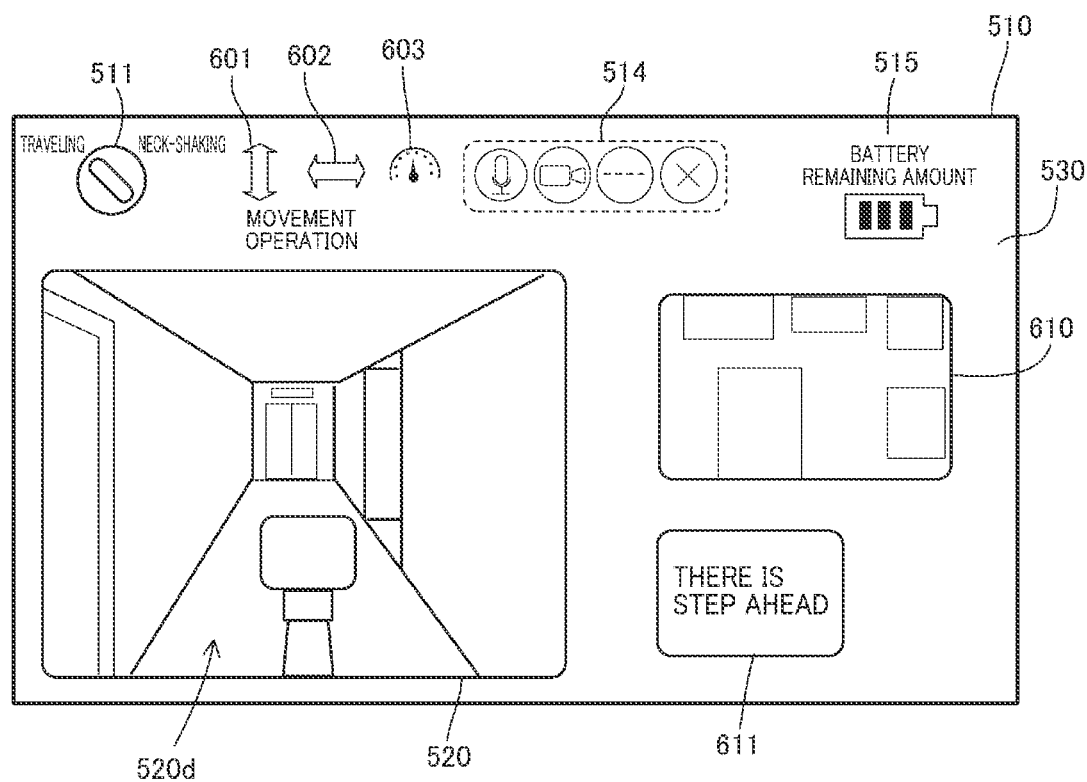
FIG. 10 is an explanatory diagram of a display mode of the operation screen in a situation in which the mobile robot is moving indoors.

In step S51 of FIG. 6, as illustrated in FIG. 10, the screen display controller 31 transmits, to the operation terminal 100, the screen data of the operation screen 510 in the movement display mode, and causes the operation screen 510 to be displayed on the terminal display unit 141 of the operation terminal 100. The operation screen 510 includes the first sub screen 520 for displaying a monitor image based on the image captured by the robot camera 62, and the second sub screen 530 for displaying an image for supporting an operation for moving the mobile robot 10.

FIG. 10 illustrates the operation screen 510 in a situation in which the mobile robot 10 is moving inside a building (indoors). In the movement display mode, a forward/backward movement icon for giving an instruction on a forward or backward movement of the mobile robot 10 and a leftward/rightward movement icon 602 for giving an instruction on a leftward or rightward movement are displayed. In addition, a speed meter 603 that displays a moving speed of the mobile robot 10 is displayed. Furthermore, a floor layout diagram 610 of the building in which the mobile robot 10 is moving is displayed.

In subsequent step S52, the obstacle recognition unit 38 searches for an obstacle present in the surroundings of the mobile robot 10. Then, the obstacle recognition unit 38 advances the process to step S60 when recognizing the obstacle, or advances the process to step S53 when not recognizing the obstacle. In step S60, as illustrated in FIG. 6, the screen display controller 31 displays an obstacle notification window 611 for providing notification of the presence of an obstacle on the second sub screen 530. In the obstacle notification window 611, an attention message (here, a message "There is a step ahead"), an image of an obstacle, or the like is displayed.

In next step S53, the screen display controller 31 determines whether a selection operation of selecting the image part displayed on the first sub screen 520 has been performed in a state where the moving speed of the mobile robot 10 is a low-speed determination speed (for example, the moving speed is set to several kilometers per hour). Then, the screen display controller 31 advances the process to step S61, when the selection operation of selecting the image part is performed, or advances the process to step S54, when the selection operation of selecting the image part is not performed.

Figure 11:
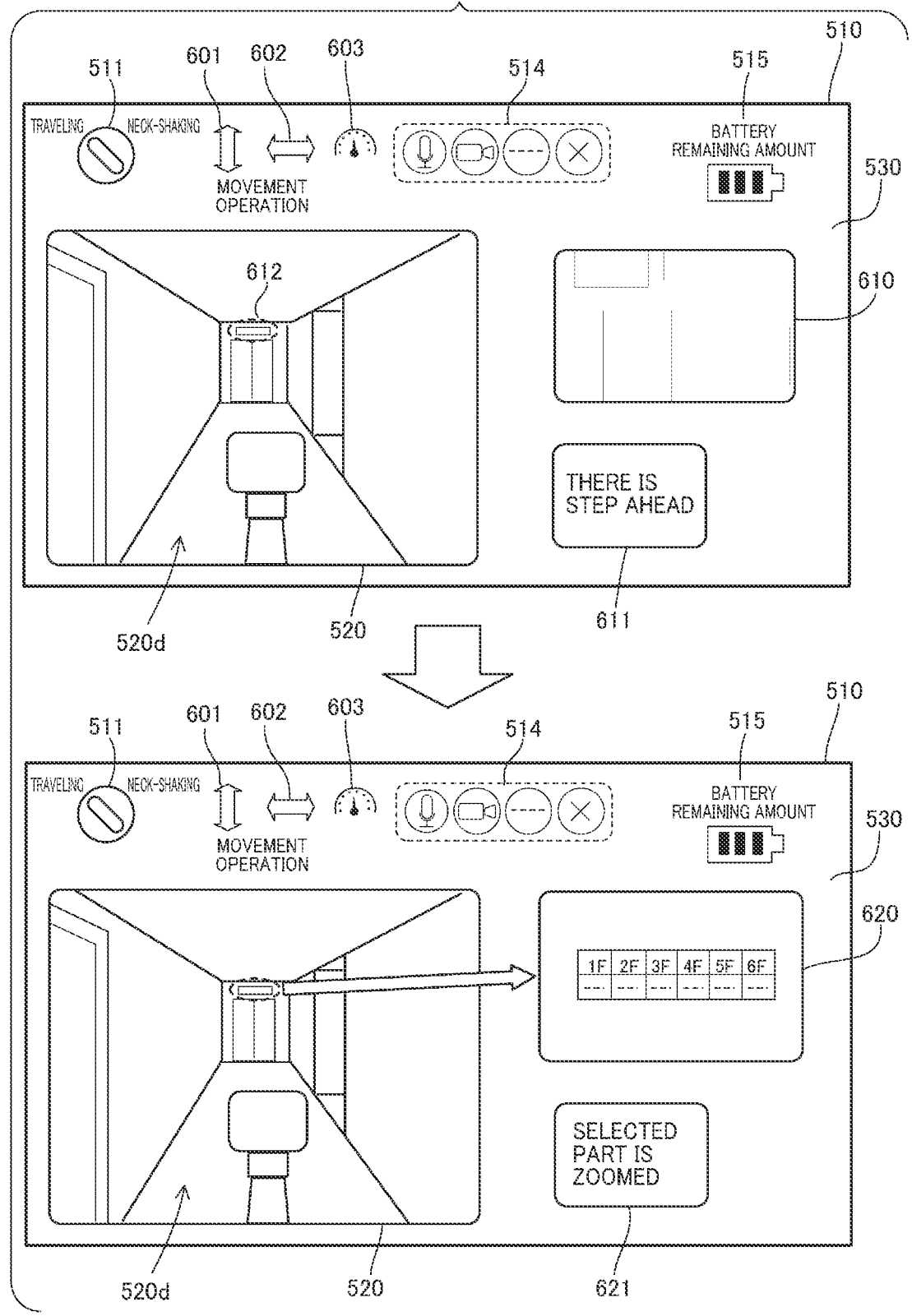
FIG. 11 is an explanatory diagram of a mode in which a part of a monitor image is enlarged and displayed.

In step S61, as illustrated in FIG. 11, when an image part 612 (here, an image part of a floor guide panel) of the first sub screen 520 is selected, the screen display controller 31 displays, on the second sub screen 530, an enlarged window 620 obtained by enlarging the image part 612. Accordingly, while checking ahead of the mobile robot 10 in a wide range on the first sub screen 520, the user U is able to visually recognize details of a target object that the user U desires to check on the enlarged window 620 on the second sub screen 530.

In subsequent step S54, the moving situation recognition unit 33 determines whether the mobile robot 10 is present in a sightseeing spot. Then, the moving situation recognition unit 33 advances the process to step S62 in a case where the mobile robot 10 is present in the sightseeing spot, or advances the process to step S55 in a case where the mobile robot 10 is not located in the sightseeing spot.

Figure 12:
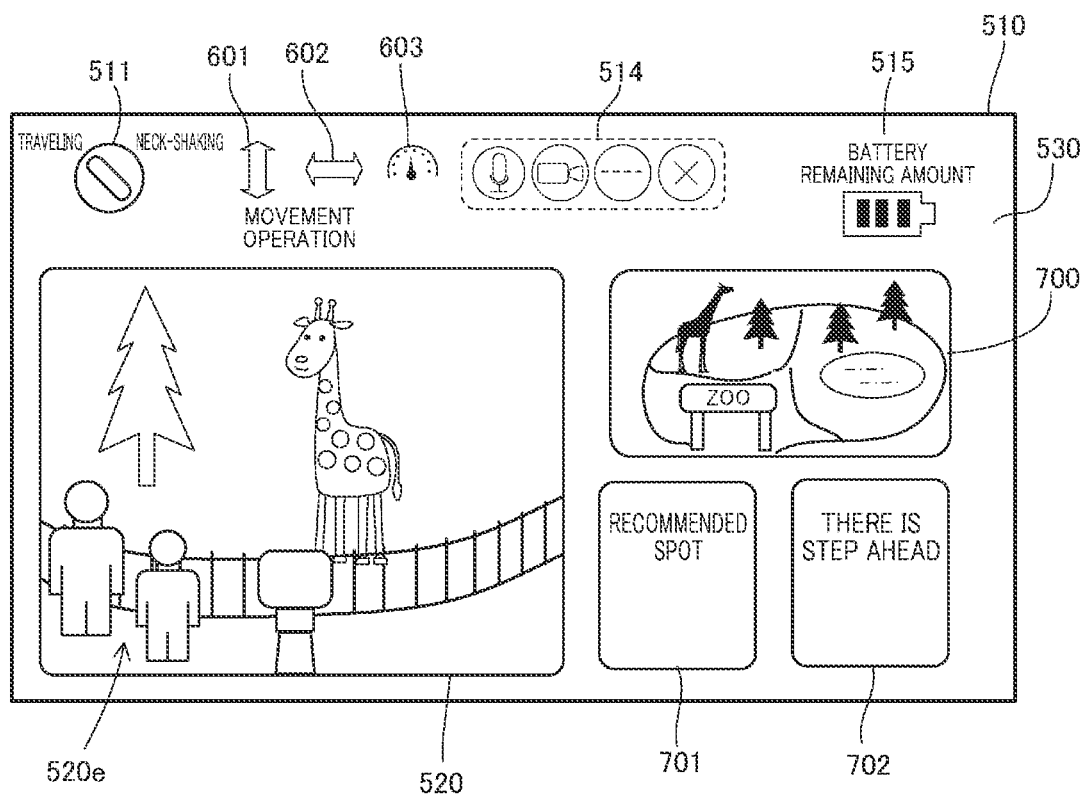
FIG. 12 is an explanatory diagram of the operation screen in a situation in which the mobile robot is moving in a sightseeing spot.

In step S62, as illustrated in FIG. 12, the screen display controller 31 displays the operation screen 510 including the first sub screen 520 for displaying a captured image 520e of the surroundings of the mobile robot 10, and the second sub screen 530 for displaying a map 700 of the sightseeing spot (here, a zoo). Furthermore, the screen display controller 31 displays additional information 701 for displaying additional information at the present location of the mobile robot 10 or in the vicinity of the mobile robot 10.

In addition, when the obstacle recognition unit 38 recognizes an obstacle in the vicinity of the mobile robot 10, the screen display controller 31 also displays an obstacle notification window 702 in the process of step S60.

In subsequent step S55, the moving situation recognition unit 33 determines whether the moving speed of the mobile robot 10 is equal to or higher than a high-speed determination speed (for example, the speed is set to several tens of kilometers per hour). Then, the moving situation recognition unit 33 advances the process to step S63, in a case where the moving speed of the mobile robot 10 is equal to or higher than the high-speed determination speed, or advances the process to step S56, in a case where the moving speed of the mobile robot 10 is lower than the high-speed determination speed.

Figure 13:
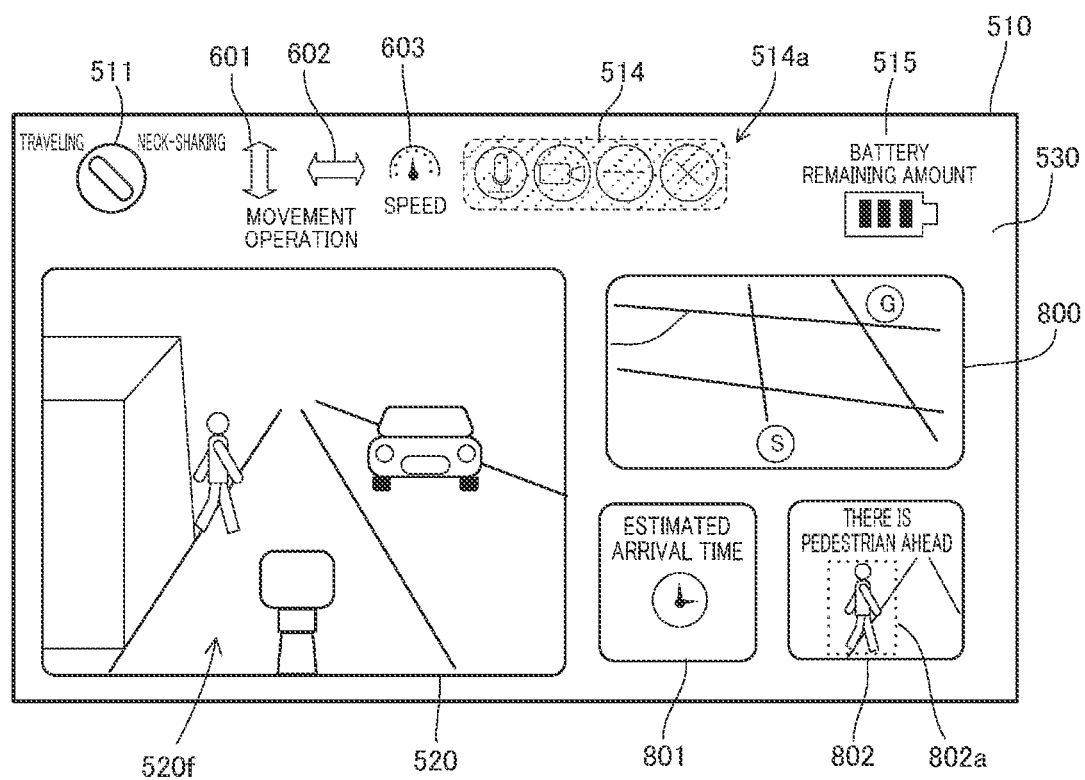
FIG. 13 is an explanatory diagram of the operation screen in a situation in which the mobile robot is moving on an outdoor road.

In step S63, as illustrated in FIG. 13, the screen display controller 31 displays the operation screen 510 including the first sub screen 520 for displaying a captured image 520f of the front of the mobile robot 10, and the second sub screen 530 for displaying a route guidance window 800 indicating a route Rt from a current location S of the mobile robot 10 to a destination G on a map of the movement area of the mobile robot 10. The display of the route guidance window 800 enables support for the user U to move the mobile robot 10 to the destination.

Furthermore, the screen display controller 31 displays a predicted arrival time 801 at the destination on the second sub screen 530. In addition, when the obstacle recognition unit 38 recognizes an obstacle in the vicinity of the mobile robot 10, the screen display controller 31 displays an obstacle window 802 on the second sub screen 530 in the process of step S60. In the obstacle window 802, an image part of a pedestrian that has been recognized as an obstacle is displayed in a highlighted manner by a frame 802a.

In addition, while the mobile robot 10 is moving at the high-speed determination speed or higher, an operation for communication is prohibited. Therefore, as illustrated in FIG. 13, the screen display controller 31 displays a communication icon 514 to be darker (in a different display mode) than a frontward/backward movement icon 601 and a leftward/rightward movement icon 602 that can be operated. Accordingly, the user U is made to understand that the operation of the communication icon 514 is disabled. Note that as a different display mode, another display mode, such as displaying an operable icon in color and displaying an inoperable icon in gray scale, may be used.

7. Other Embodiments

In the above embodiment, the display mode switching unit 34 switches between the stop display mode and the movement display mode in response to the operation of the mode changeover switch 531 by the user U in the process of the flowchart illustrated in FIG. 4. As another embodiment, the stop display mode and the movement display mode may be switched in accordance with the moving situation of the mobile robot 10 recognized by the moving situation recognition unit 33. For example, while the mobile robot 10 is in the stop state for a predetermined time or more, the mode may be switched to the stop display mode. In addition, while the mobile robot is moving at a predetermined speed or higher, the mode may be switched to the movement display mode.

Figure 8:
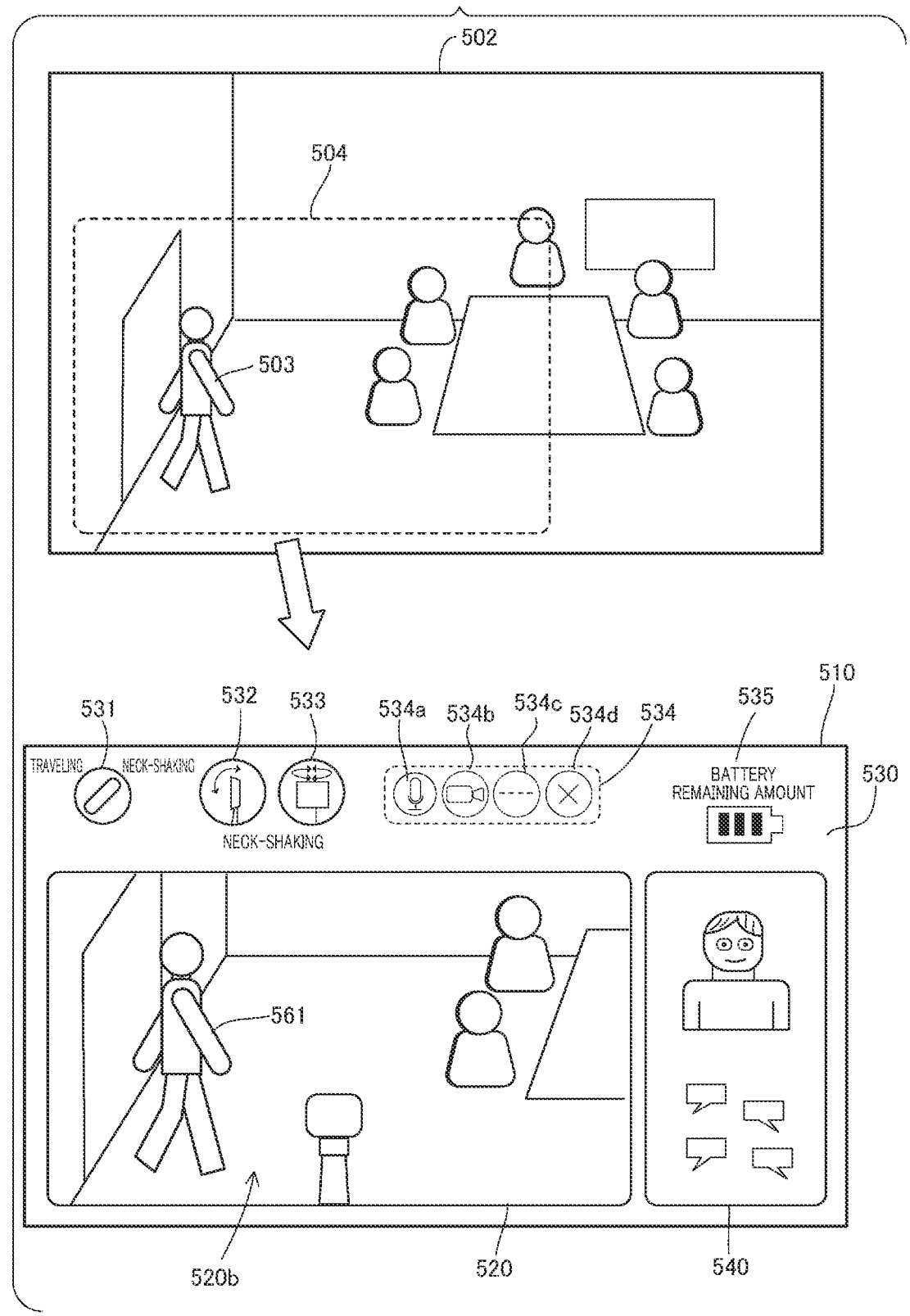
FIG. 8 is an explanatory diagram of a display mode of the operation screen in a situation in which a new person is added to a conference place.

In the above embodiment, as illustrated in FIGS. 8 and 9, when an object in motion is recognized by the in-motion object recognition unit 39 in the stop display mode, the display of the first sub screen 520 is switched from the first monitor screen 520a that does not include the image part of the object in motion to the second monitor screens 520b and 520c that include the image part of the object in motion. As another embodiment, the second monitor screens 520b and 520c including the image part of the object in motion may be displayed on the second sub screen 530 without changing the display of the first sub screen 520.

Alternatively, the first sub screen 520 may be switched from the first monitor screen to the second monitor screen in the stop display mode, and the second monitor screen may be displayed on the second sub screen 530 in the movement display mode.

In the above embodiment, when an image part of a person displayed on the first sub screen 520 is subjected to a touch operation, the communication target selection reception unit 36 sets such a person corresponding to the image part subjected to the touch operation as a communication target. As another embodiment, identification information (a name, an ID, and the like) of a person or a robot corresponding to an image part displayed on the first sub screen 520 may be displayed in a list on the first sub screen 520, so that a communication target can be selected by a touch operation on the identification information displayed in the list.

In the above embodiment, the display of the operation screen 510 is controlled in the process of the screen display controller 31 to the user face image display controller 45 by the robot processor 30 of the mobile robot 10. As another embodiment, all or a part of the screen display controller 31 to the user face image display controller 45 may be configured with the terminal processor 120 of the operation terminal 100. In this case, the terminal processor 120 controls the operation screen 510 displayed on the terminal display unit 141, based on the image captured by the robot camera 62, the data of the sound detected by the robot microphone 64, the data of the object detected by the LiDAR 65, and the like, which are transmitted from the mobile robot 10.

In addition, all or a part of the screen display controller 31 to the user face image display controller 45 may be configured with the robot management server 220. In this case, the robot management server 220 communicates with the mobile robot 10 and the operation terminal 100, receives the image captured by the robot camera 62, operation data on the operation terminal 100, and the like, and controls display of the terminal display unit 141 of the operation terminal 100.

In the above embodiment, the current location recognition unit 32 may recognize that the mobile robot 10 is located inside a room, based on the map DB 52 or the building DB 53. Then, in a state where the current location recognition unit 32 recognizes that the mobile robot 10 is located inside the room, when an object entering the room is detected, based on an image captured by the robot camera 62, an object detection signal detected by the LiDAR 65, a sound detected by the robot microphone 64, and the like, the in-motion object recognition unit 39 may recognize the object as an object in motion.

In the above embodiment, the example in which the present invention is applied to the mobile robot 10 including the traveling unit 14 has been described. However, the present invention is also applicable to a monitor robot that is installed in a specific indoor place such as a conference room or a public facility and that does not have a moving function. In this case, the display mode switching process illustrated in FIG. 4 is not performed, and only the screen display control in the stop display mode illustrated in FIG. 5 is performed.

Figure 2:
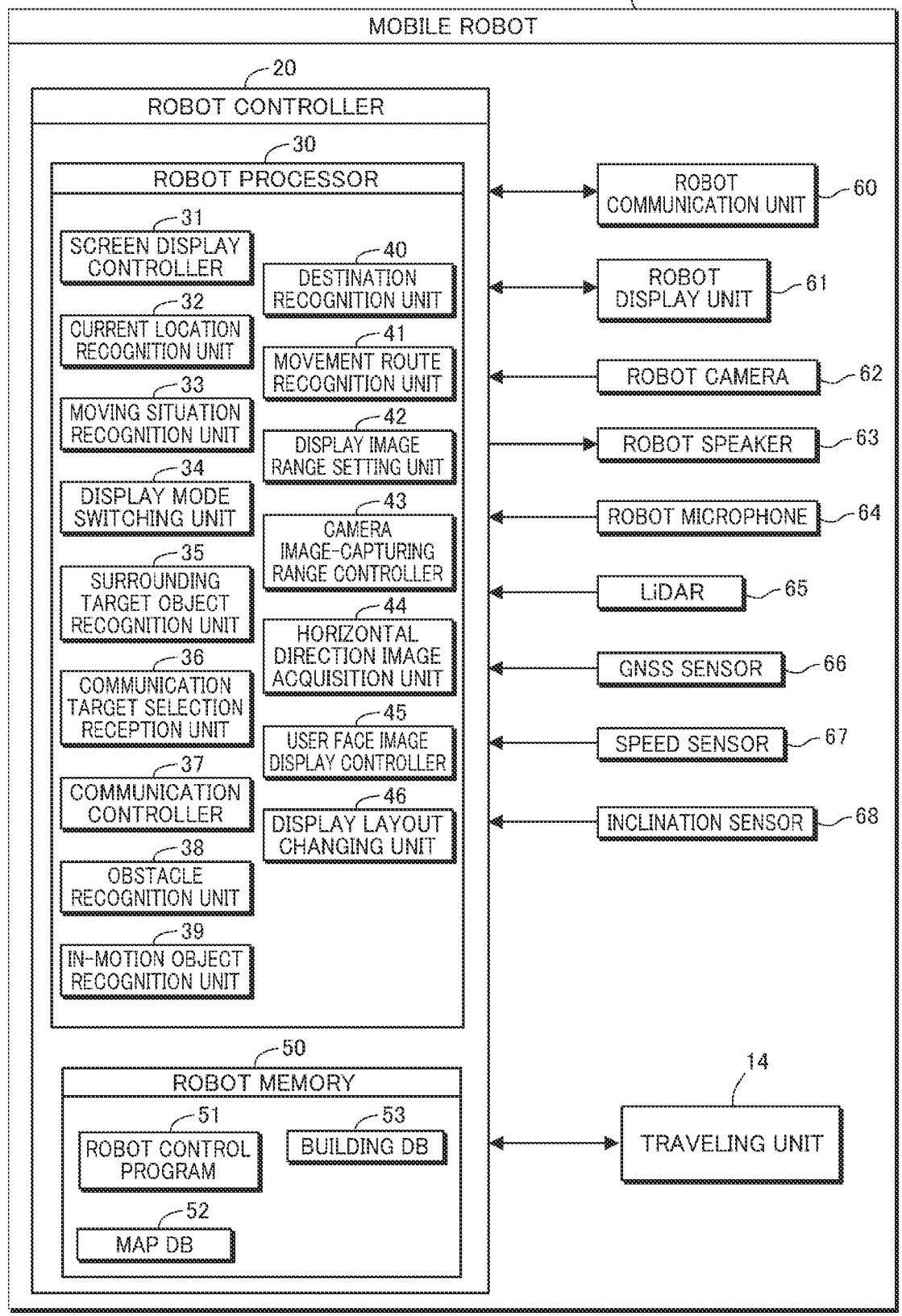
FIG. 2 is a configuration diagram of a mobile robot.
Figure 3:
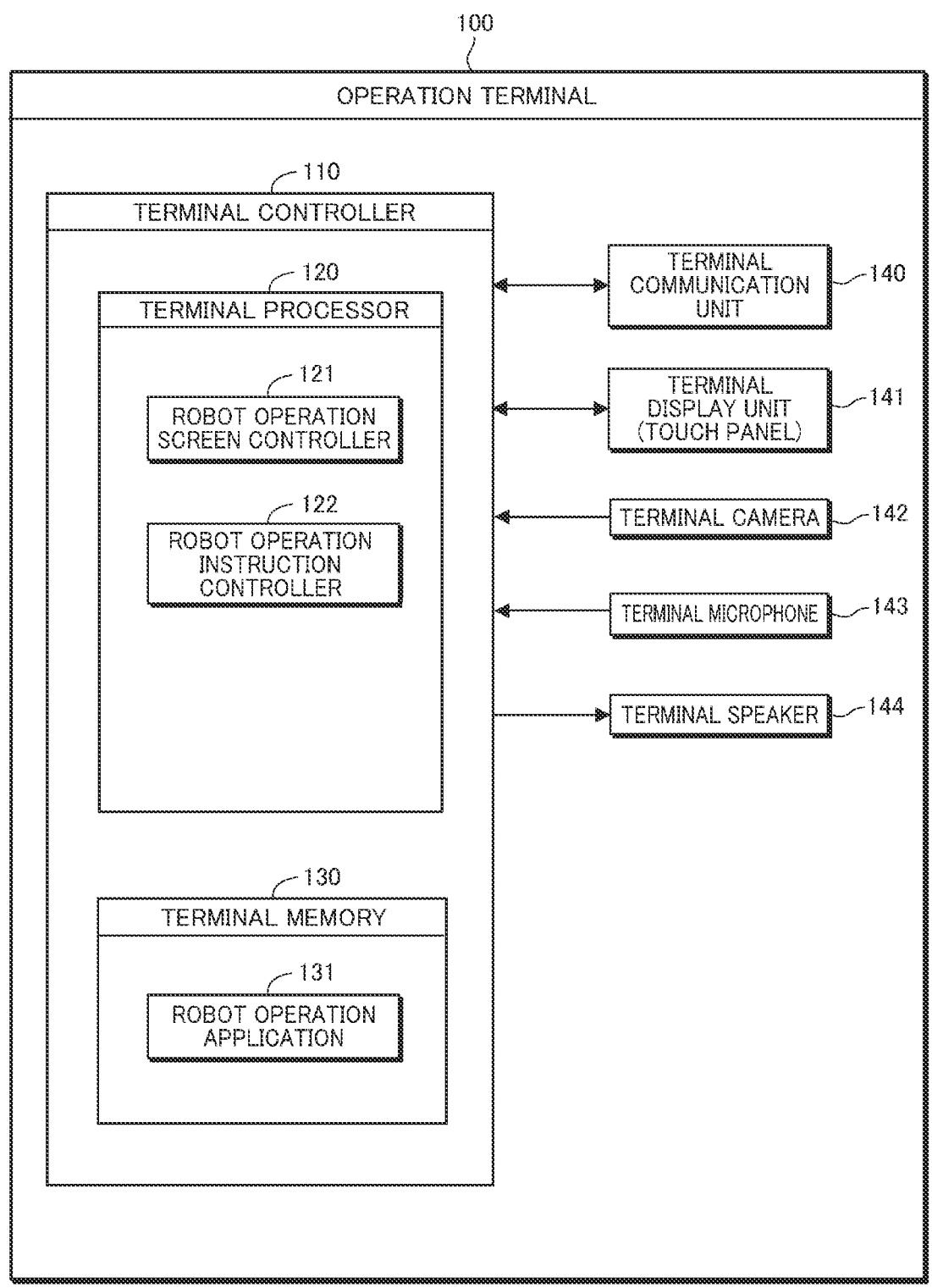
FIG. 3 is a configuration diagram of an operation terminal.

Note that FIGS. 2 and 3 are schematic diagrams illustrating the configurations of the mobile robot 10 and the operation terminal 100 in a separated manner in accordance with a main processing content in order to facilitate under-standing of the present invention. The configurations of the mobile robot 10 and the operation terminal 100 may be made in another separated manner. In addition, the process of each constituent element may be performed by one hardware unit, or may be performed by a plurality of hardware units. In addition, the process of each constituent element illustrated in FIGS. 4 to 6 may be performed by one program, or may be performed by a plurality of programs.

In addition, the remote operation system 1 includes the configuration of a remote display system in the present invention, and the operation terminal 100 includes the configuration of a display terminal in the present invention. The function of extracting the horizontal corresponding image by the horizontal direction image acquisition unit 44 corresponds to a horizontal corresponding image extraction unit in the present disclosure.

In addition, in step S21 of FIG. 5, the process of switching the display on the first sub screen 520 from the first monitor screen 520*a* of the first image range 501 that does not include the image part of the object in motion to the second monitor screens 520*b* and 520*c* of the second image ranges 504 and 505 that include the image part of the object in motion corresponds to a first screen switching process. Here, the screen display controller 31 may perform a process of returning the display on the first sub screen 520 to the first monitor screen 520*a*, when a predetermined time has elapsed since the time when the display on the first sub screen 520 is switched from the first monitor screen 520*a* to the second monitor screens 520*b* and 520*c*. The configuration in which the screen display controller 31 transmits data of the first monitor screen 520*a* and the second monitor screens 520*b* and 520*c* to the operation terminal 100 corresponds to a monitor screen data transmission unit in the present disclosure.

In addition, in FIG. 13, in accordance with an establishment of the screen switching condition (here, the recognition of a pedestrian that is an obstacle), the process of switching the display on the operation screen 530 from the operation screen (corresponding to a third monitor screen in the present invention) for displaying the monitor image (corresponding to an image part of a third image range in the present invention) only on the first sub screen 520 to an operation screen (corresponding to a fourth monitor screen in the present invention) for displaying the monitor image on the first sub screen 520 and also displaying, on the second sub screen 530, an image part obtained by enlarging a part of the monitor image on the first sub screen 520 (corresponding to a fourth image part obtained by enlarging a part of the third image range in the present invention) corresponds to a second screen switching process in the present invention.

Further, the configuration in which the terminal processor 120 receives and acquires the captured image via the terminal communication unit 140 corresponds to a captured image acquisition unit in the present disclosure.

8. Configuration Supported by Above Embodiments

The above embodiments are specific examples of the following configurations.

(Item 1) A remote display system including: a robot; a display terminal configured to communicate with the robot, the robot including a camera configured to capture an image of surroundings of the robot, and transmitting, to the display terminal, monitor image information based on a captured image by the camera, the display terminal including a terminal display unit, receiving the monitor image information, and displaying, on the terminal display unit, a monitor screen including a monitor image based on the captured image; and a screen display controller configured to perform a first screen switching process of switching the monitor screen to be displayed on the terminal display unit from a first monitor screen for displaying a first image range of the captured image to a second monitor screen for displaying a second image range different from the first image range of the captured image, in accordance with a predetermined screen switching condition.

According to the remote display system in Item 1, the screen display of the terminal display unit is switched from the first monitor screen to the second monitor screen in which the image range of the captured image to be displayed is different from that of the first monitor screen, in accordance with the screen switching condition, so that the monitor screen of the robot can be displayed on the display terminal in a mode in which the user easily recognizes the surrounding situation of the robot.

(Item 2) The remote display system as described in Item 1 further includes an in-motion object recognition unit configured to recognize an object in motion present in the surroundings of the camera, in which the in-motion object recognition unit sets, as the screen switching condition, that the object in motion is recognized outside a first image-capturing range corresponding to the first image range within an image-capturing range of the camera, and the screen display controller sets the second image range to include an image part of the object in motion.

According to the remote display system in Item 2, it is possible to facilitate recognition of an object in motion near the robot by the user.

(Item 3) The remote display system as described in Item 2, in which the in-motion object recognition unit recognizes either a person or another robot that is in motion as the object in motion.

According to the remote display system in Item 3, it is possible to facilitate recognition of a person or another robot in operation near the robot by the user.

(Item 4) The remote display system as described in Item 2 or Item 3, in which the screen display controller sets, as the second monitor screen, a screen for displaying an enlarged image of an image range including the image part of the object in motion that has been recognized by the in-motion object recognition unit.

According to the remote display system in Item 4, it is possible to facilitate identification of the object in motion by the user by enlarging and displaying the image part of the object in motion.

(Item 5) The remote display system as described in one of Item 2 to Item 4, in which the screen display controller sets, as the second image range, a range obtained by enlarging the first image range to include the image part of the object in motion that has been recognized by the in-motion object recognition unit.

According to the remote display system in Item 5, it is possible to make the user pay attention to an object in motion while ensuring the recognition of a wide range in the surroundings of the robot by the user.

(Item 6) The remote display system as described in one of Item 1 to Item 5, in which the screen display controller sets the first image range to include all of image parts of a person and another robot included in the captured image.

According to the remote display system in Item 6, for example, in a case where the robot is located at a conference place, it is possible to make the user recognize the situations of all the people participating in the conference and another robot.

(Item 7) The remote display system as described in one of Item 1 to Item 6, in which when a predetermined time has elapsed since a time when the monitor screen is switched from the first monitor screen to the second monitor screen in accordance with the screen switching condition, the screen display controller returns the monitor screen to the first monitor screen.

According to the remote display system in Item 7, it is no longer necessary for the user to perform the switching operation from the second monitor screen to the first monitor screen, and the usability of the user can be improved.

(Item 8) The remote display system as described in one of Item 1 to Item 7, in which the display terminal includes a display image range setting unit configured to set a range of the captured image to be displayed on the terminal display unit in response to an operation on the display terminal by a user, and the screen display controller sets, as the second image range, the range that has been set by the display image range setting unit.

According to the remote display system in Item 8, it is possible to display, on the second monitor screen, an image of a target according to an interest of the user.

(Item 9) The remote display system as described in one of Item 1 to Item 8, in which the robot includes a body unit, and a head unit configured to rotate or swing with respect to the body unit, and the camera is provided in the body unit.

According to the remote display system in Item 9, it is possible to prevent an uncomfortable feeling from being given to the user who is viewing the first monitor screen and the second screen displayed on the terminal display unit due to shaking of the captured image of the camera, which is an inconvenience that may occur in a case where the camera is provided in the robot.

(Item 10) The remote display system as described in one of Item 1 to Item 5, in which the robot includes an object detection sensor configured to detect an object present in the surroundings of the robot, and the in-motion object recognition unit recognizes the object in motion, based on detection information by the object detection sensor.

According to the remote display system in Item 10, an object in motion is recognizable by a change in detection information by the object detection sensor.

(Item 11) The remote display system as described in Item 10 further includes a current location recognition unit configured to recognize a current location of the robot, based on map information, and in a state where the current location recognition unit recognizes that the robot is located inside a room, when the object detection sensor detects an object entering the room, the in-motion object recognition unit recognizes the object as the object in motion.

According to the remote operation system in Item 11, in a situation in which the robot is located in a room, an object that is moving outside the room can be excluded from a recognition target of the in-motion object recognition unit. For example, an object moving outside a window of a room, an object moving in a corridor outside a room in a situation in which a conference is being held in the room arranged in an open space, and an object moving outside a door in a situation in which the door of the room is open can be excluded from objects to be recognized as the object in motion.

(Item 12) The remote display system as described in one of Item 2 to Item 5, in which the robot includes an identification signal reception unit configured to receive an identification signal transmitted from an object, and the in-motion object recognition unit recognizes the object in motion, based on a reception situation of the identification signal by the identification signal reception unit.

According to the remote display system in Item 12, the object in motion is recognizable by a change in strength of the identification signal or the like received by the identification signal reception unit.

(Item 13) The remote display system as described in one of Item 2 to Item 5, in which the robot includes a sound sensor configured to detect a sound in the surroundings of the robot, and the in-motion object recognition unit recognizes the object in motion in accordance with a detection situation of the sound by the sound sensor.

According to the remote display system in Item 13, it is possible to recognize the object in motion, based on a change in volume of a sound by the sound sensor, or the like.

(Item 14) The remote display system as described in Item 13, in which when the in-motion object recognition unit recognizes a plurality of the objects in motion, based on the detection situation of the sound by the sound sensor, the screen display controller sets the second image range to include the image part of the object in motion having a maximum volume of an emitted sound.

According to the remote display system in Item 14, it is possible to facilitate the recognition of the object in motion having the maximum volume of the emitted sound by the user.

(Item 15) The remote display system as described in Item 13 or Item 14, in which the in-motion object recognition unit recognizes the object in motion that is standing and speaking, based on the captured image and the detection situation of the sound by the sound sensor, and when the in-motion object recognition unit recognizes the object in motion that is standing and speaking, the screen display controller sets the second image range to include an image part of the object in motion that is standing and speaking.

According to the remote display system in Item 15, it is possible to facilitate the recognition of the object in motion that is standing and speaking by the user.

(Item 16) The remote display system as described in Item 13, in which when the in-motion object recognition unit recognizes a plurality of the objects in motion, the screen display controller sets the second image range to include an image part of the object in motion selected by a priority order set in a sequential order of an object in motion that is speaking at a largest voice, an object in motion that is moving, and the object in motion that is standing and speaking.

According to the remote display system in Item 16, in a case where there is a plurality of objects in motion, an object in motion to be a target that is easily recognized by the user can be determined in accordance with the priority order.

(Item 17) The remote display system as described in one of Item 1 to Item 16, further includes a camera image-capturing range controller configured to control an image-capturing range of the camera to include all of image parts of a person and another robot present in the surroundings of the robot in the captured image by the camera.

According to the remote display system in Item 17, for example, by changing the direction of the camera in a case where the camera is movable, or by moving the robot in a case where the robot is a mobile robot, the image-capturing range of the camera is controlled to include all of the image parts of the people and another robot present in the surroundings of the robot, and it is thus possible to make the user recognize all the people and another robot present in the surroundings of the robot.

(Item 18) The remote display system as described in one of Item 1 to Item 17 further includes a horizontal corresponding image extraction unit configured to extract, from the captured image, a horizontal corresponding image corresponding to a case where an image-capturing direction of the camera is a horizontal direction, and the screen display controller extracts the first monitor screen from the horizontal corresponding image.

According to the remote display system in Item 18, when the imaging direction of the camera is not the horizontal direction, by extracting the first monitor surface from the horizontal corresponding image, the first monitor screen displayed on the terminal display unit can be made to match the direction of the line of sight of the user.

(Item 19) The remote display system as described in one of Item 1 to Item 18, in which the screen display controller performs, in accordance with the screen switching condition, either the first screen switching process or a second screen switching process of switching the monitor screen from a third monitor screen for displaying an image part of a third image range of the captured image to a fourth monitor screen for displaying the image part of the third image range and a fourth image part obtained by enlarging a part of the third image range.

According to the remote display system in Item 19, the fourth monitor screen for displaying the fourth screen obtained by enlarging a wide range of the third image range and a part of the third image range enables the provision of detailed image information of a specific range while ensuring the provision of a wide range of the image information in the surroundings of the robot.

(Item 20) The remote display system as described in Item 19, in which the robot is a mobile robot, the remote display system further includes a moving situation recognition unit configured to recognize a movement situation of the robot, and when the moving situation recognition unit recognizes that the robot is in a stopped state, the screen display controller performs the first screen switching process, and when the moving situation recognition unit recognizes that the robot is in a moving state, the screen display controller performs the second screen switching process.

According to the remote display system in Item 20, when the robot is stopped, the second monitor screen limited to the image part of the specific range is displayed by the first screen switching process, so as to facilitate the recognition of the image of the specific range by the user. On the other hand, when the robot is moving, the fourth monitor screen including a wide range of the image part and an image part obtained by enlarging a part of the wide range of the image part is displayed by the second screen switching processing, so as to facilitate the recognition of a part of the image information in the wide range by the user while providing the user with the image information in the wide range in the surroundings of the robot.

(Item 21) A robot includes: a camera configured to capture an image of surroundings; a robot communication unit configured to communicate with a display terminal; a screen display controller configured to set a monitor screen to be displayed on the display terminal, the monitor screen being based on a captured image by the camera; and a monitor screen data transmission unit configured to transmit, via the robot communication unit to the display terminal, data of the monitor screen that has been set by the screen display controller, and the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition.

According to the robot in Item 21, by switching the data of the monitor screen to be transmitted to the display terminal from the data of the first monitor screen to the data of the second monitor screen in which the image range of the captured image to be displayed is different from that of the first monitor screen, in accordance with the screen switching condition, the monitor screen of the robot can be displayed on the terminal display unit of the display terminal in a mode in which the user easily recognizes the surrounding situation of the robot.

(Item 22) A display terminal includes: a terminal display unit; a terminal communication unit configured to communicate with a robot including a camera; a captured image acquisition unit configured to receive and acquire a captured image by the camera via the terminal communication unit, the captured image being transmitted from the robot; and a screen display controller configured to control a display of a monitor screen on the terminal display unit, based on the captured image, and the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition.

According to the display terminal in Item 22, the screen display on the terminal display unit is switched from the first monitor screen to the second monitor screen in which the image range of the captured image to be displayed is different from that of the first monitor screen in accordance with the screen switching condition, so that the monitor screen of the robot can be displayed on the display terminal in a mode in which the user easily recognizes the surrounding situation of the robot.

REFERENCE SIGNS LIST 1 remote operation system
10 mobile robot
14 traveling unit
20 robot controller
30 robot processor
31 screen display controller
32 current location recognition unit
33 moving situation recognition unit
34 display mode switching unit
35 surrounding target object recognition unit
36 communication target selection reception unit
37 communication controller
38 obstacle recognition unit
39 in-motion object recognition unit
40 destination recognition unit
41 movement route recognition unit
42 display image range setting unit
43 camera image-capturing range controller
44 horizontal direction image acquisition unit
45 user face image display controller
61 robot display unit
62 robot camera 63 robot speaker
64 robot microphone
65 LiDAR
66 GNSS sensor
67 speed sensor
68 inclination sensor
100 operation terminal
110 terminal controller
120 terminal processor
121 robot operation screen controller
122 robot operation instruction controller
141 terminal display unit
142 terminal camera
143 terminal microphone
144 terminal speaker

What is claimed is:

1. A remote display system comprising:
a robot;
a display terminal comprising a terminal communication unit configured to communicate with the robot, and a terminal display unit, the robot including a camera configured to capture an image of surroundings of the robot, and transmitting, to the display terminal via communication with the terminal communication unit, monitor image information based on a captured image by the camera, the display terminal receiving the monitor image information, and displaying, on the terminal display unit, a monitor screen including a monitor image based on the captured image; and
a processor configured to function as a screen display controller configured to perform a first screen switching process of switching the monitor screen to be displayed on the terminal display unit from a first monitor screen for displaying a first image range of the captured image to a second monitor screen for displaying a second image range different from the first image range of the captured image, in accordance with a predetermined screen switching condition,
wherein the screen display controller performs, in accordance with the screen switching condition, either the first screen switching process or a second screen switching process of switching the monitor screen from a third monitor screen for displaying an image part of a third image range of the captured image to a fourth monitor screen for displaying an image part of the third image range and a fourth image part obtained by enlarging a part of the third image range.

2. The remote display system according to claim 1, wherein
the processor is further configured to function as an in-motion object recognition unit configured to recognize an object in motion present in the surroundings of the camera,
the in-motion object recognition unit sets, as the screen switching condition, that the object in motion is recognized outside a first image-capturing range corresponding to the first image range within an image-capturing range of the camera, and
the screen display controller sets the second image range to include an image part of the object in motion.

3. The remote display system according to claim 2, wherein
the in-motion object recognition unit recognizes either a person or another robot that is in motion as the object in motion.

4. The remote display system according to claim 2, wherein
the screen display controller sets, as the second monitor screen, a screen for displaying an enlarged image of an image range including the image part of the object in motion that has been recognized by the in-motion object recognition unit.

5. The remote display system according to claim 2, wherein
the screen display controller sets, as the second image range, a range obtained by enlarging the first image range to include the image part of the object in motion that has been recognized by the in-motion object recognition unit.

6. The remote display system according to claim 1, wherein
the screen display controller sets the first image range to include all of image parts of a person and another robot included in the captured image.

7. The remote display system according to claim 1, wherein
when a predetermined time has elapsed since a time when the monitor screen is switched from the first monitor screen to the second monitor screen in accordance with the screen switching condition, the screen display controller returns the monitor screen to the first monitor screen.

8. The remote display system according to claim 1, wherein
the display terminal includes a display terminal processor configured to function as a display image range setting unit configured to set a range of the captured image to be displayed on the terminal display unit in response to an operation on the display terminal by a user, and
the screen display controller sets, as the second image range, the range that has been set by the display image range setting unit.

9. The remote display system according to claim 1, wherein
the robot includes a body unit, and a head unit configured to rotate or swing with respect to the body unit, and
the camera is provided in the body unit.

10. The remote display system according to claim 2, wherein
the robot includes an object detection sensor configured to detect an object present in the surroundings of the robot, and
the in-motion object recognition unit recognizes the object in motion, based on detection information by the object detection sensor.

11. The remote display system according to claim 10, wherein
the processor is further configured to function as a current location recognition unit configured to recognize a current location of the robot, based on map information, and
in a state where the current location recognition unit recognizes that the robot is located inside a room, when the object detection sensor detects an object entering the room, the in-motion object recognition unit recognizes the object as the object in motion.

12. The remote display system according to claim 2, wherein
the robot includes an identification signal reception unit configured to receive an identification signal transmitted from an object, and the in-motion object recognition unit recognizes the object in motion, based on a reception situation of the identification signal by the identification signal reception unit.

13. The remote display system according to claim 2, wherein
the robot includes a sound sensor configured to detect a sound in the surroundings of the robot, and
the in-motion object recognition unit recognizes the object in motion in accordance with a detection situation of the sound by the sound sensor.

14. The remote display system according to claim 13, wherein
the screen display controller sets the second image range to include the image part of the object in motion having a maximum volume of an emitted sound, when the in-motion object recognition unit recognizes a plurality of the objects in motion, based on the detection situation of the sound by the sound sensor.

15. The remote display system according to claim 13, wherein
the in-motion object recognition unit recognizes the object in motion that is standing and speaking, based on the captured image and the detection situation of the sound by the sound sensor, and
when the in-motion object recognition unit recognizes the object in motion that is standing and speaking, the screen display controller sets the second image range to include an image part of the object in motion that is standing and speaking.

16. The remote display system according to claim 13, wherein
when the in-motion object recognition unit recognizes a plurality of the objects in motion, the screen display controller sets the second image range to include an image part of the object in motion selected by a priority order set in a sequential order of an object in motion that is speaking at a largest voice, an object in motion that is moving, and the object in motion that is standing and speaking.

17. The remote display system according to claim 1, wherein the processor is further configured to function as a camera image-capturing range controller configured to control an image-capturing range of the camera to include all of image parts of a person and another robot present in the surroundings of the robot in the captured image by the camera.

18. The remote display system according to claim 1, wherein the processor is further configured to function as a horizontal corresponding image extraction unit configured to extract, from the captured image, a horizontal corresponding image corresponding to a case where an image-capturing direction of the camera is a horizontal direction,
Wherein the screen display controller extracts the first monitor screen from the horizontal corresponding image.

19. The remote display system according to claim 1, wherein
the robot is a mobile robot,
the processor is further configured to function as a moving situation recognition unit configured to recognize a movement situation of the robot, and
when the moving situation recognition unit recognizes that the robot is in a stopped state, the screen display controller performs the first screen switching process, and when the moving situation recognition unit recognizes that the robot is in a moving state, the screen display controller performs the second screen switching process.

20. A robot comprising:
a camera configured to capture an image of surroundings;
a robot communication unit configured to communicate with a display terminal;
a processor configured to function as a screen display controller configured to set a monitor screen to be displayed on the display terminal, the monitor screen being based on a captured image by the camera; and
a monitor screen data transmission unit configured to transmit, via the robot communication unit to the display terminal, data of the monitor screen that has been set by the screen display controller, wherein
the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition, and
the screen display controller performs, in accordance with the screen switching condition, either the first screen switching process or a second screen switching process of switching the monitor screen from a third monitor screen for displaying an image part of a third image range of the captured image to a fourth monitor screen for displaying an image part of the third image range and a fourth image part obtained by enlarging a part of the third image range.

21. A display terminal comprising:
a terminal display unit;
a terminal communication unit configured to communicate with a robot including a camera;
a captured image acquisition unit configured to receive and acquire a captured image by the camera via the terminal communication unit, the captured image being transmitted from the robot; and
a processor configured to function as a screen display controller configured to control a display of a monitor screen on the terminal display unit, based on the captured image, wherein
the screen display controller performs a first screen switching process of switching the monitor screen from a first monitor screen for displaying an image part of a first range of the captured image to a second monitor screen for displaying an image part of a second range different from the first range of the captured image, in accordance with a predetermined screen switching condition, and
the screen display controller performs, in accordance with the screen switching condition, either the first screen switching process or a second screen switching process of switching the monitor screen from a third monitor screen for displaying an image part of a third image range of the captured image to a fourth monitor screen for displaying an image part of the third image range and a fourth image part obtained by enlarging a part of the third image range.

* * * * *